US010546588B2

(12) United States Patent
Kofman et al.

(10) Patent No.: US 10,546,588 B2
(45) Date of Patent: Jan. 28, 2020

(54) MEDIA GENERATING AND EDITING SYSTEM THAT GENERATES AUDIO PLAYBACK IN ALIGNMENT WITH TRANSCRIBED TEXT

(71) Applicant: TRINT LIMITED, London (GB)

(72) Inventors: Jeffrey Kofman, London (GB); Mark Boas, Florence (IT); Mark Panaghiston, Edinburgh (GB); Laurian Gridinoc, Leeds (GB)

(73) Assignee: Trint Limited, London (GB)

(*) Notice: Subject to any disclaimer, the term of this patent is extended or adjusted under 35 U.S.C. 154(b) by 0 days.

(21) Appl. No.: 15/557,897

(22) PCT Filed: Mar. 11, 2016

(86) PCT No.: PCT/GB2016/050677
§ 371 (c)(1),
(2) Date: Sep. 13, 2017

(87) PCT Pub. No.: WO2016/146978
PCT Pub. Date: Sep. 22, 2016

(65) Prior Publication Data

US 2018/0053510 A1 Feb. 22, 2018

Related U.S. Application Data

(60) Provisional application No. 62/132,759, filed on Mar. 13, 2015.

(51) Int. Cl.
*G10L 15/00* (2013.01)
*G10L 15/26* (2006.01)
(Continued)

(52) U.S. Cl.
CPC .......... *G10L 15/265* (2013.01); *G06F 16/685* (2019.01); *G06F 17/2765* (2013.01); *G10L 15/187* (2013.01)

(58) Field of Classification Search
USPC .................................. 704/231–257, 270–275
See application file for complete search history.

(56) References Cited

U.S. PATENT DOCUMENTS 6,360,237 B1 3/2002 Schulz et al.
7,174,296 B2 2/2007 Bartosik
(Continued)

FOREIGN PATENT DOCUMENTS

EP 1374226 B1 7/2005

OTHER PUBLICATIONS

European Patent Office, The International Search Report and Written Opinion issued in PCT/GB2016/050677, dated Jun. 15, 2016, 10 pages, European Patent Office, Rijswick, Netherlands.

*Primary Examiner* — Jesse S Pullias
(74) *Attorney, Agent, or Firm* — Marshall & Melhorn, LLC

(57) ABSTRACT

A media generating and editing system that generates audio playback in alignment with text that has been automatically transcribed from the audio. A transcript data file that includes a plurality of text words transcribed from audio words included in the audio data is stored. Timing data is paired with the text words indicating locations in the audio data of the corresponding audio words from which the text words are transcribed. The audio data is provided for playback at a user device. The text words are displayed on a display screen at a user device and a visual marker is displayed on the display screen to indicate the text words on the display screen in time alignment with the audio playback of the corresponding audio words at the user device. The text words in the transcript data file are amended in response to inputs from the user device.

24 Claims, 26 Drawing Sheets

520

Jeff K: So has has it sunk in ? Five medals in five games. An American first.

Kim R: It really hasn't sunk in yet.

......

(51) Int. Cl.

| | |
|---|---|
| ***G06F 16/683*** | (2019.01) |
| ***G06F 17/27*** | (2006.01) |
| ***G10L 15/187*** | (2013.01) |

(56) References Cited

U.S. PATENT DOCUMENTS

| | | | | |
|---|---|---|---|---|
| 8,302,010 | B2 | 10/2012 | Phillips et al. | |
| 8,504,369 | B1 * | 8/2013 | Chigier | G06F 17/24 704/246 |
| 8,572,488 | B2 | 10/2013 | Phillips et al. | |
| 8,966,360 | B2 | 2/2015 | Phillips et al. | |
| 8,972,269 | B2 | 3/2015 | Hoeg | |
| 2002/0010916 | A1 * | 1/2002 | Thong | H04N 5/278 725/1 |
| 2002/0116188 | A1 * | 8/2002 | Amir | G10L 13/00 704/235 |
| 2005/0080633 | A1 * | 4/2005 | Lueck | G10L 15/22 704/278 |
| 2008/0177536 | A1 | 7/2008 | Sherwani et al. | |
| 2012/0101847 | A1 * | 4/2012 | Johnson | G06Q 10/00 705/3 |
| 2013/0031479 | A1 | 1/2013 | Flowers | |
| 2015/0261419 | A1 | 9/2015 | Flowers | |

* cited by examiner

520

Jeff K: So has has it sunk in ? Five medals in five games. An American first.

Kim R: It really hasn't sunk in yet.

```
{ "job": {   "lang": "en-US",   "user_id": 38,   "name": "ntVaOiv0S92Jash5UzMx1g.mp3",
  "duration": 1086,  "created_at": "Fri Feb 27 12:12:30 2015",   "id": 23113 },

 "speakers": [
  {   "duration": "3.601",    "confidence": null,    "name": "M1",    "time": "6.067"  },
  {   "duration": "2.250",    "confidence": null,    "name": "M2",    "time": "9.668"  },
  {   "duration": "112.452",    "confidence": null,    "name": "M1",    "time": "11.918" },
    .........],

 "words": [
  {    "duration": "0.360",    "confidence": "0.995",    "name": "So",    "time": "6.067"   },
  {    "duration": "0.330",    "confidence": "0.700",    "name": "has",    "time": "7.737"   },
  {    "duration": "0.230",    "confidence": "0.871",    "name": "has",    "time": "8.098"   },
  {    "duration": "0.110",    "confidence": "0.995",    "name": "it",    "time": "8.328"   },
  {    "duration": "0.330",    "confidence": "0.995",    "name": "sunk",    "time": "8.877"  },
  {    "duration": "0.320",    "confidence": "0.995",    "name": "in",    "time": "9.207"   },
  {    "duration": "0.140",    "confidence": null,    "name": ".",    "time": "9.527"   },
  {    "duration": "0.480",    "confidence": "0.995",    "name": "Five",    "time": "9.668"   },
  {    "duration": "0.540",    "confidence": "0.995",    "name": "medals",  "time": "10.148" },
  {    "duration": "0.180",    "confidence": "0.995",    "name": "in",   "time": "10.748"   },
  {    "duration": "0.440",    "confidence": "0.995",    "name": "five",  "time": "10.928"  },
  {    "duration": "0.490",    "confidence": "0.995",    "name": "games",  "time": "11.367"  },
  {    "duration": "0.060",    "confidence": null,    "name": ".",   "time": "11.857"  },
  {    "duration": "0.110",    "confidence": "0.584",  "name": "An",   "time": "11.918" },
  {    "duration": "0.560",    "confidence": "0.598",  "name": "Armenian",  "time": "12.027" },
 {   "duration": "0.310",   "confidence": "0.995",   "name": "first",   "time": "12.637" },
 {   "duration": "0.410",  "confidence": null,  "name": ".",  "time": "12.947"  },
 {   "duration": "0.490", "confidence": "0.995",  "name": "It",  "time": "13.357" },
  { "duration": "0.290",   "confidence": "0.995",  "name": "really",  "time": "13.848" },
  { "duration": "0.440",   "confidence": "0.995",  "name": "hasn't",  "time": "14.137"},
  { "duration": "0.250",   "confidence": "0.995",  "name": "sunk", "time": "14.578" },
  { "duration": "0.240",   "confidence": "0.995",  "name": "in",  "time": "14.828" },
  {"duration": "0.340",   "confidence": "0.569",   "name": "yet", "time": "15.068"},
 ........]
```

{"_id":"ntVaOiv0S92Jash5UzMx1g","user":"5489b6abe4b0e66fc6491c85","state":5,"metadata":{"title":"kim
r.mp3"},"export":{"url":"http://export.trint.co.s3.amazonaws.com/27gm2hVLR-mkw8aa-Wb_9g/
ntVaOiv0S92Jash5UzMx1g.mp3","ssl_url":"https://s3.amazonaws.com/export.trint.co/27gm2hVLR-mkw8aa-Wb_9g/
704 ntVaOiv0S92Jash5UzMx1g.mp3"},
"transcript":
{"speakers": 702
{"M1":{"name":"M1"},"M2":{"name":"M2"},"F1":{"name":"F1"},"M3":{"name":"M3"},"F3":{"name":"F3"},"F9":{"name":"F
706 9"},"F2":{"name":"F2"},"M4":{"name":"M4"},"F4":{"name":"F4"},"M6":{"name":"M6"},"M5":{"name":"M5"},"F5":{"name"
:"F5"},"M7":{"name":"M7"},"M8":{"name":"M8"},"M9":{"name":"M9"},"F6":{"name":"F6"},"M10":{"name":"M10"},"F7":{
"name":"F7"},"M11":{"name":"M11"},"M12":{"name":"M12"},"F8":{"name":"F8"}},
"words":[ 705-1
{"duration":360,"confidence":0.995,"name":"So","time":6067,"speaker":"M1","para":"p0", strike":"false",
"highlight":"false", "comment": null}, 705-2
{"duration":330,"confidence":0.7,"name":"has","time":7737,"speaker":"M1","para":"p0": "strike":"false",
"highlight":"false", "comment": null},
{"duration":230,"confidence":0.871,"name":"has","time":8098 "speaker":"M1","para":"p0""strike":"false", 705-3
"highlight":"false", "comment": null},
{"duration":110,"confidence":0.995,"name":"it","time":8328,"speaker":"M1","para":"p0""strike":"false",
"highlight":"false", "comment": null},
{"duration":330,"confidence":0.995,"name":"sunk","time":8877,"speaker":"M1","para":"p0""strike":"false",
"highlight":"false", "comment": null}, 705-6
{"duration":320,"confidence":0.995,"name":"in.","time":9207,"speaker":"M1","para":"p0""strike":"false",
"highlight":"false", "comment": null},
{"duration":480,"confidence":0.995,"name":"Five","time":9668,"speaker":"M2","para":"p1""strike":"false", 705-7
"highlight":"false", "comment": null},
{"duration":540,"confidence":0.995,"name":"medals","time":10148,"speaker":"M2","para":"p1""strike":"false",
"highlight":"false", "comment": null},
{"duration":180,"confidence":0.995,"name":"in","time":10748,"speaker":"M2","para":"p1""strike":"false",
"highlight":"false", "comment": null},
{"duration":440,"confidence":0.995,"name":"five","time":10928,"speaker":"M2","para":"p1""strike":"false",
"highlight":"false", "comment": null},
{"duration":490,"confidence":0.995,"name":"games.","time":11367,"speaker":"M2","para":"p1""strike":"false",
"highlight":"false", "comment": null},
{"duration":110,"confidence":0.584,"name":"An","time":11918,"speaker":"M1","para":"p2""strike":"false", 705-12
"highlight":"false", "comment": null},
{"duration":560,"confidence":0.598,"name":"Armenian","time":12027,"speaker":"M1","para":"p2""strike":"false",
"highlight":"false", "comment": null}, 705-13
{"duration":310,"confidence":0.995,"name":"first.","time":12637,"speaker":"M1","para":"p2""strike":"false",
"highlight":"false", "comment": null},
{"duration":490,"confidence":0.995,"name":"It","time":13357,"speaker":"M1","para":"p2""strike":"false",
"highlight":"false", "comment": null},
{"duration":290,"confidence":0.995,"name":"really","time":13848,"speaker":"M1","para":"p2""strike":"false",
"highlight":"false", "comment": null},
{"duration":440,"confidence":0.995,"name":"hasn't","time":14137,"speaker":"M1","para":"p2""strike":"false",
"highlight":"false", "comment": null},
{"duration":250,"confidence":0.995,"name":"sunk","time":14578,"speaker":"M1","para":"p2""strike":"false",
"highlight":"false", "comment": null},
{"duration":240,"confidence":0.995,"name":"in","time":14828,"speaker":"M1","para":"p2""strike":"false", 705-20
"highlight":"false", "comment": null},
{"duration":340,"confidence":0.569,"name":"yet","time":15068,"speaker":"M1","para":"p2"} .....]

,"format":-1,"version":0},"status":"transcribed","created":"2015-02-27T12:10:57.714Z","updated":"2015-02-
27T12:25:10.964Z"}

{"duration":560,"confidence":1,"name":"American","time":12027,"speaker":"M1","para":"p2"“strike”:”false”, “highlight”:”false”, “comment”: null}, {"duration":330,"confidence":0.7,"name":"has","time":7737,"speaker":"M1","para":"p0": "strike":"false", "highlight":"false", "comment": null},    705-2

{"duration":230,"confidence":0.871,"name":"has","time":8098    705-3
"speaker":"M1","para":"p0""strike":"false", "highlight":"false", "comment": null}, Orginal objects

↓

{"duration":560,"confidence":1,"name":"has","time":7737,"speaker":"M1","para":"p0":    705-2A
"strike":"false", "highlight":"false", "comment": null},, Updated Object

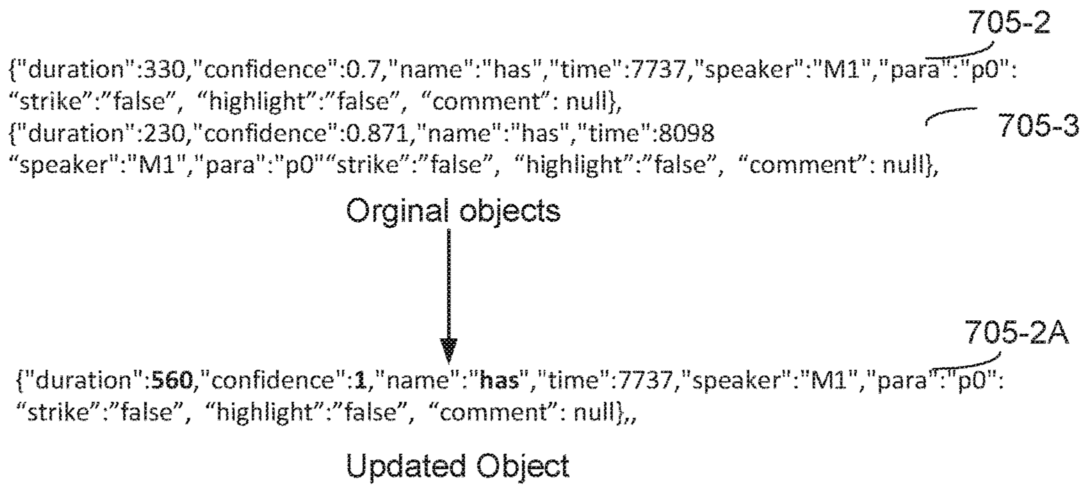

FIG. 21

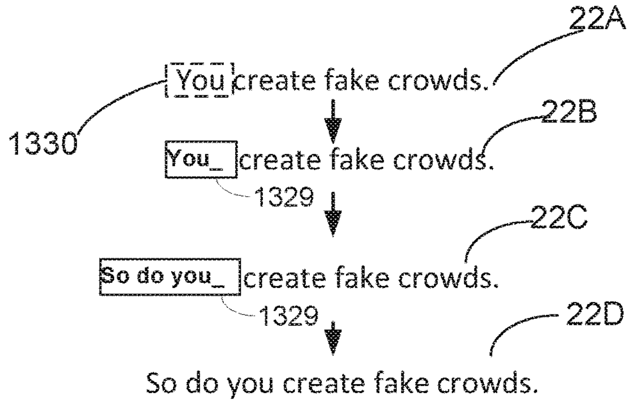

FIG. 22

{"duration":140,"confidence":0.992,"name":"You","time":258310,"speaker":"M1","para":"p6".....}    23

↓

{"duration":40,"confidence":1,"name":"So","time":258310,"speaker":"M1","para":"p6".....}    23A
{"duration":40,"confidence":1,"name":"do","time":258350,"speaker":"M1","para":"p6".....}    23B
{"duration":60,"confidence":1,"name":"you","time":258390,"speaker":"M1","para":"p6".....}    23C

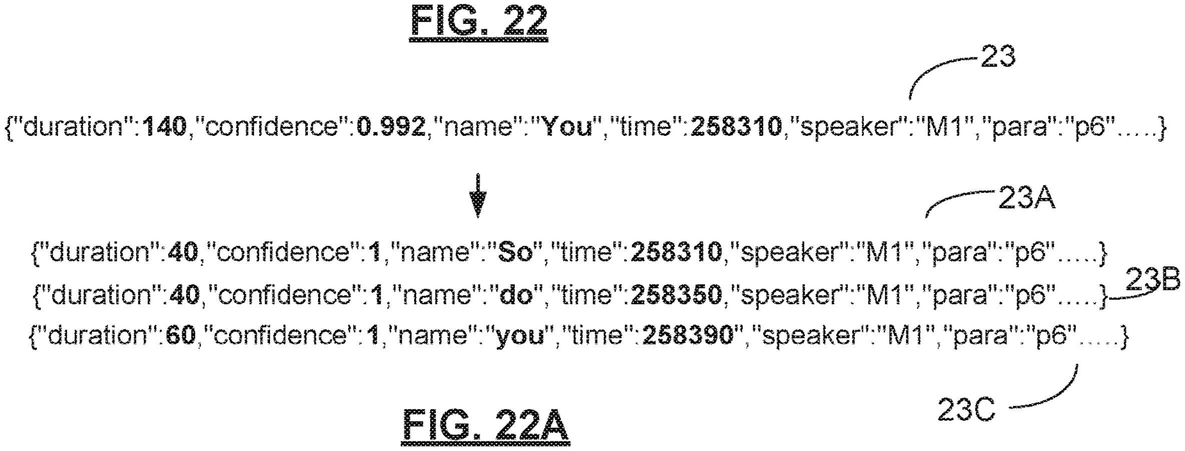

FIG. 22A

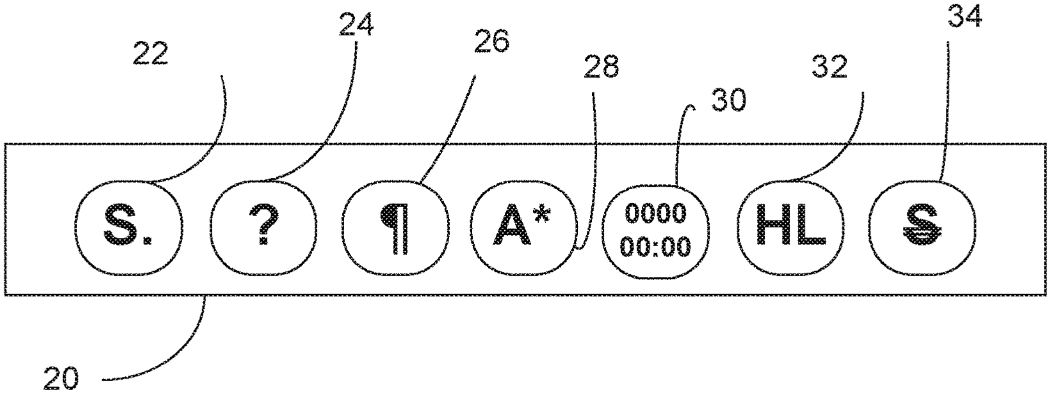

FIG. 23

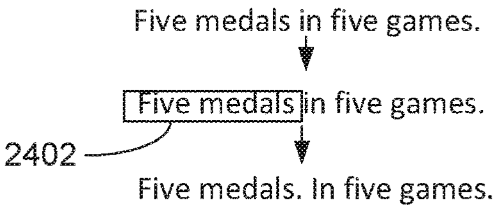

FIG. 24

```
{"duration":540,"confidence":0.995,"name":"medals","time":10148,"speaker":"M2","para":"p1""strike":"false",
"highlight":"false", "comment": null},                                                          705-8
{"duration":180,"confidence":0.995,"name":"in","time":10748,"speaker":"M2","para":"p1""strike":"false",
"highlight":"false", "comment": null},
                                                                                                705-9      705-8
{"duration":540,"confidence":0.995,"name":"medals.","time":10148,"speaker":"M2","para":"p1""strike":"false",
"highlight":"false", "comment": null},
{"duration":180,"confidence":0.995,"name":"In","time":10748,"speaker":"M2","para":"p1""strike":"false",
"highlight":"false", "comment": null},
                                                                                                705-9
```

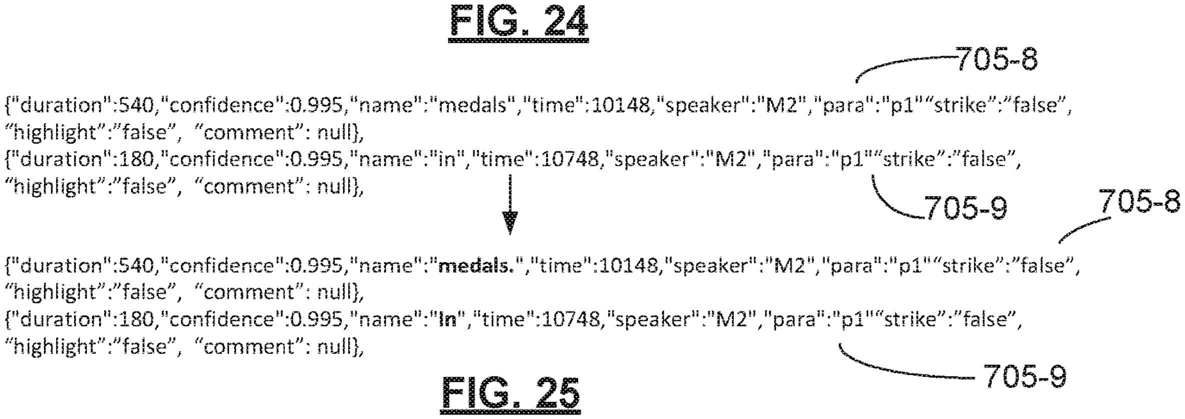

FIG. 25

So has it sunk in.
↓
2402
↓
So has it sunk in ?

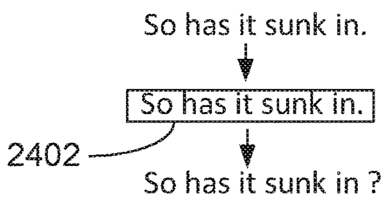

FIG. 26

{"duration":320,"confidence":0.995,"name":"in.","time":9207,"speaker":"M1","para":"p0""strike":"false",
"highlight":"false", "comment": null},

↓ — 705-6

{"duration":320,"confidence":0.995,"name":"in ?","time":9207,"speaker":"M1","para":"p0""strike":"false",
"highlight":"false", "comment": null},

— 705-6

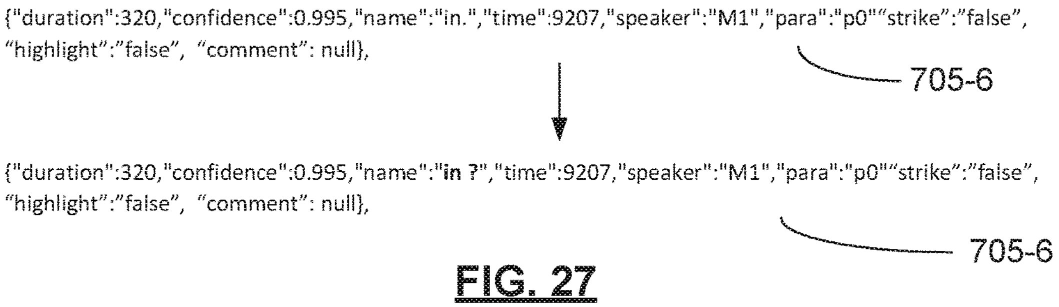

FIG. 27

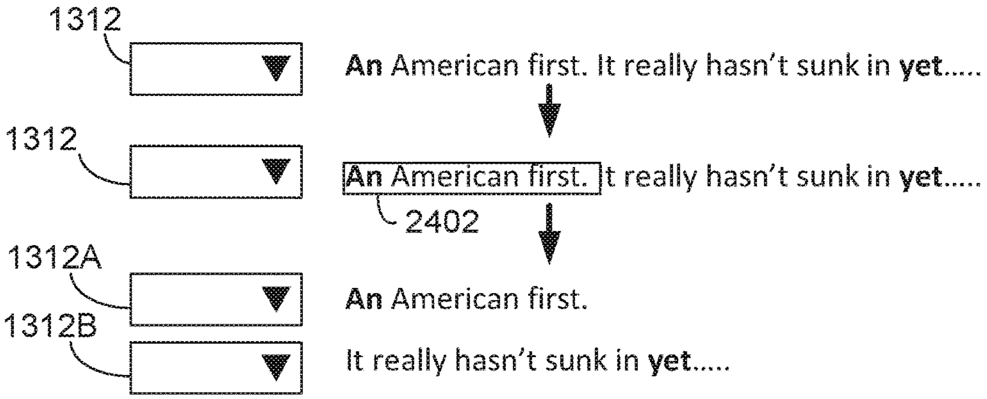

{"duration":310,"confidence":0.995,"name":"first.","time":12637,"speaker":"M1","para":"p2""strike":"false",
"highlight":"false", "comment": null},
{"duration":490,"confidence":0.995,"name":"It","time":13357,"speaker":"M1","para":"p2""strike":"false",
"highlight":"false", "comment": null},

↓  705-14    705-15

{"duration":310,"confidence":0.995,"name":"first.","time":12637,"speaker":"M1","para":"p2""strike":"false",
"highlight":"false", "comment": null},
{"duration":490,"confidence":0.995,"name":"It","time":13357,"speaker":"M2","para":"p3""strike":"false",
"highlight":"false", "comment": null},

— 705-15

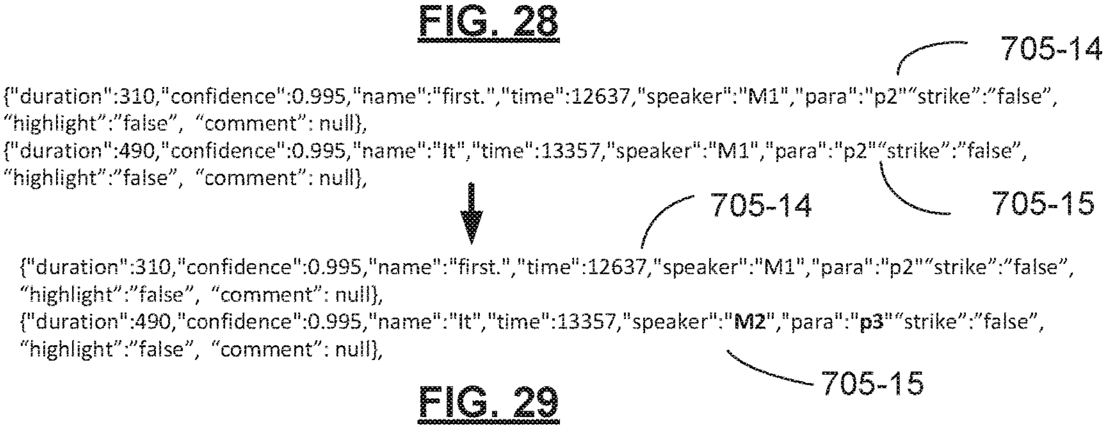

FIG. 29

{"duration":230,"confidence":0.871,"name":"has","time":8098 "speaker":"M1","para":"p0""strike":"false", "highlight":"false", "comment": null}, {"duration":230,"confidence":0.871,"name":"has","time":8098 "speaker":"M1","para":"p0""strike":"true", "highlight":"false", "comment": null},

MEDIA GENERATING AND EDITING SYSTEM THAT GENERATES AUDIO PLAYBACK IN ALIGNMENT WITH TRANSCRIBED TEXT

RELATED APPLICATIONS

This application claims the benefit of and priority to U.S. Provisional Patent Application Ser. No. 62/132,759 filed Mar. 13, 2015.

BACKGROUND

This disclosure relates to a system and method for generating and editing media files.

Although there has been extensive development in speech-to-text (S2T) technology over the last decade, there has been surprisingly limited adoption of S2T technology among some groups who work in areas that require extensive transcription. By way of example one such group that has not yet extensively embraced S2T is journalists. A journalist typically spends hours each week (and often each day) listening to and manually transcribing the content of his/her interviews before writing stories for newspapers, radio, television or online.

In newsrooms around the world transcription is the bottleneck in every journalist's workflow, requiring a repetitive and laborious process: 1) listen to a few seconds of the recorded interview/news conference; 2) pause the audio/video; 3) manually type the words just heard; 4) play a few more seconds; 5) type; 6) repeat. It can take a journalist approximately one hour to precisely transcribe 10 minutes of audio. Furthermore, at current rates, outsourced manual transcription is simply not a realistic option.

The inaccuracies of S2T systems have made it perilously unreliable for an industry such as journalism that has accuracy as its foundation. Transcription errors can be difficult to identify, requiring a time-consuming review of the audio/video (A/V) recording and the corresponding transcript. Transcription errors also make it impossible to accurately search S2T transcripts. Consequently journalists and editors find it safer to stick to the traditional, if inefficient, method of manual transcription. The arrival of contextually-aware natural language programming (NLP) enabling computers to derive meaning from human or natural language input is lessening transcription errors, but there are still errors and the lack of verifiable S2T continues to keep journalists away.

Accordingly, there is a need for improved ST2 systems that can be efficiently and cost effectively employed by high volume media users such as journalists.

SUMMARY

According to an example embodiment is a media generating and editing system and method that generates audio playback in alignment with text that has been automatically transcribed from the audio. A transcript data file that includes a plurality of text words transcribed from audio words included in the audio data is stored. Timing data is paired with the text words indicating locations in the audio data of the corresponding audio words from which the text words are transcribed. The audio data is provided for playback at a user device. The text words are displayed on a display screen at a user device and a visual marker is displayed on the display screen to indicate the text words on the display screen in time alignment with the audio playback of the corresponding audio words at the user device. The text words in the transcript data file are amended in response to inputs from the user device.

According to another example embodiment is a media generating and editing system that includes an interface system for receiving instructions and data; and electronic storage storing a media file that includes audio data and a transcript data file that includes a plurality of text words transcribed from audio words included in the audio data, and timing data paired with the text words indicating locations in the audio data of the corresponding audio words from which the text words are transcribed. The system includes a processing system in communication with the interface and the electronic storage and configured by computer code to: enable audio playback of the audio data at a user device; and enable an editing interface that: presents the text words on a display screen at a user device; provides a visual marker that indicates the text words on the display screen in time alignment with the audio playback of the corresponding audio words at the user device; and amends the text words in the transcript data file in response to inputs from the user device.

BRIEF DESCRIPTION OF THE DRAWINGS

For a more complete understanding of this disclosure, reference is now made to the following description taken in conjunction with the accompanying drawings listed below.

FIG. 5 illustrates a manual transcription of two example lines of an interview;

FIG. 6 illustrates the content of a transcription file of the interview of FIG. 5 as generated by a speech to text system of the media generating and editing system of FIG. 1;

FIG. 7 illustrates the content of the transcription file of FIG. 6 as modified by a media editing system of the system of FIG. 1;

FIGS. 11 to 42 illustrate UI screens and transcript processing functions according to example embodiments.

Figure 1:
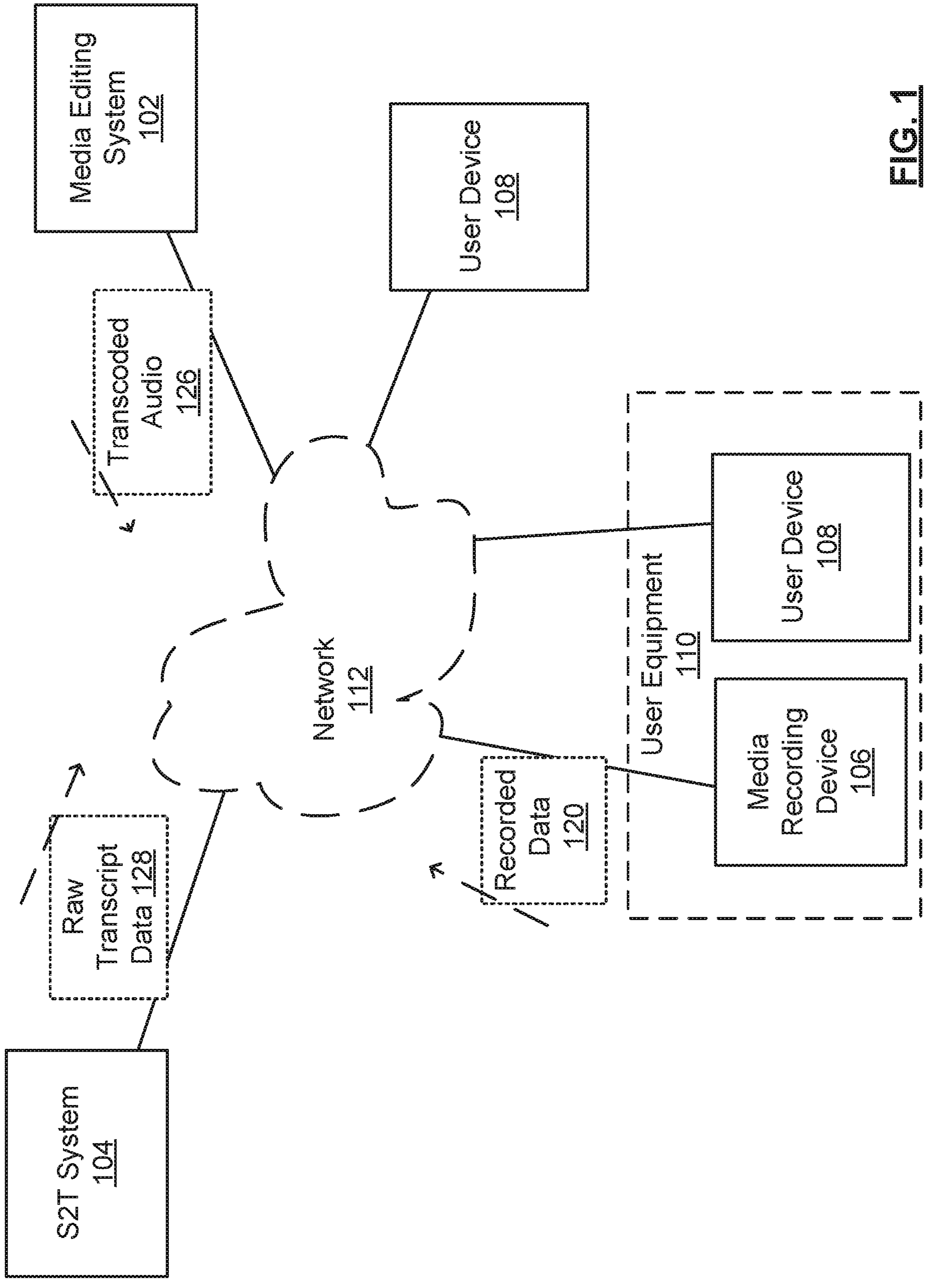
FIG. 1 is a schematic diagram of an example of an environment to which example embodiments of a media generating and editing system can be applied.

Like reference numerals are used throughout the Figures to denote similar elements and features. While aspects of the present disclosure will be described in conjunction with the illustrated embodiments, it will be understood that it is not intended to limit the present disclosure to such embodiments.

DESCRIPTION OF EXAMPLE EMBODIMENTS

The present disclosure describes a media generating and editing system that, in various example embodiments, can take a recorded audio or A/V file and provide a user such as a journalist with an automatically transcribed transcript that, in at least some applications, is one or more of searchable, verifiable, editable and exportable. Example embodiments employ a system that incorporates speech-to-text automated solutions to provide an intuitive workflow that streamlines the complex way reporters and editors have traditionally worked.

In some example embodiments, the system provides a cloud-based platform for uploading audio and video (A/V) files, returning in minutes with text that is precisely aligned with the original A/V, making it easily searchable and verifiable. In example embodiments, word-level timings are used to provide an interactive transcript in which the system highlights words as they are spoken and conversely the user can click on them to play that exact part in the A/V file. In various example embodiments, the media generating and editing system provides a platform that can provide users with one or more of precise timings, speaker identification, audio waveform, and a simple text-aligned drag-and-drop edit and export system that allow quick, accurate and efficient turnaround of content.

A possible environment in which example embodiments of a media generating and editing system can operate is illustrated in FIG. 1, which shows a distributed system in which a media editing system 102, a speech-to-text conversion system 104, media recording devices 106 and user devices 108 communicate with a communications network 112. Communications network 112 may include one or more wired communications networks or wireless communications networks or a combination of wired and wireless communications networks. Communications network 112 may include, among other things, one or more of the Internet, intranets operated by organizations or individuals, wired and wireless local area networks, wide area wireless networks such as cellular networks, cable networks, pico networks and public switched networks.

Figure 3:
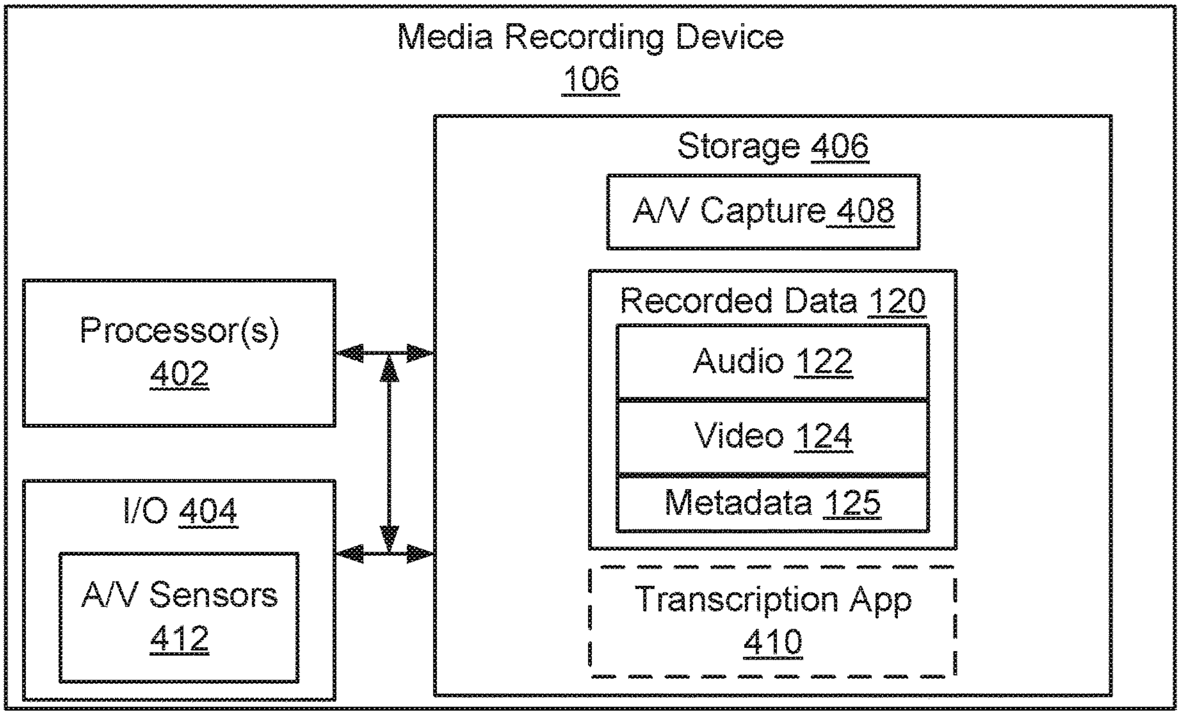
FIG. 3 is a schematic diagram of a media recording device according to example embodiments.

FIG. 3 illustrates a representative example of a media recording device 106. In the illustrated example the media recording device 106 includes one or more digital processors 402, non-transitory digital storage 406 and input/output (I/O) devices 404. Digital storage 406, which may for example include one or more different types of electronic storage, stores data captured through I/O devices 404 as well as instructions that configure the processor 402 to operate to perform the functions described herein. I/O devices 404 include user input interfaces such as touch screens and buttons, user output interfaces such as display screens and speakers, communications interfaces for exchanging messages and data with network 112, and one or both of audio and video sensors 412 such as microphones and image capturing cameras. In an example device 106, an A/V capture application 408 provides instructions that configure the media recording device 106 to use A/V sensors 412 to record and store recorded data files 120 that includes an audio component 122 and, in some embodiments, a video component 124. Recorded data files 120 may also include metadata 125, which for example may include date stamp information and title information, among other things. In some example embodiments, recorded data 120 will be an audio file such as but not limited to an .mp3 file, an .M4A or a .wav file, or other digital audio file. In some example embodiments, recorded data 120 will be an A/V file (such as, but not limited to, a .mov, .avi, or .MP4 file) that includes both an audio component 122 and a video component 124.

The media recording device 106 is enabled to transmit one or more files containing recorded data 120 through the network 112 to media editing system 102. Such enablement can be effected in a number of different ways: in one example embodiment, media recording device 106 includes one or more messaging applications that enable recorded data 120 to be sent as an attachment to an electronic message sent to an address associated with media editing system 102 such as an email message or a text message; in another example embodiment, the media recording device 106 includes a browser application that allows it to access an upload web page maintained by media editing system 102, enabling recorded data 120 to be uploaded; in another example embodiment, a dedicated transcription application 410 resides on media recording device 106 to enable recorded data 120 to be uploaded to media editing system 102.

In some example embodiments media recording device 110 is a dedicated A/V recording device. In some example embodiments media recording device 110 is implemented on a multi-purpose device such as a smart phone, tablet, smart watch, laptop computer or other computer device. In some embodiments, media recording device 106 and user device 108 are combined and implemented on a single user equipment device 110.

Figure 2:
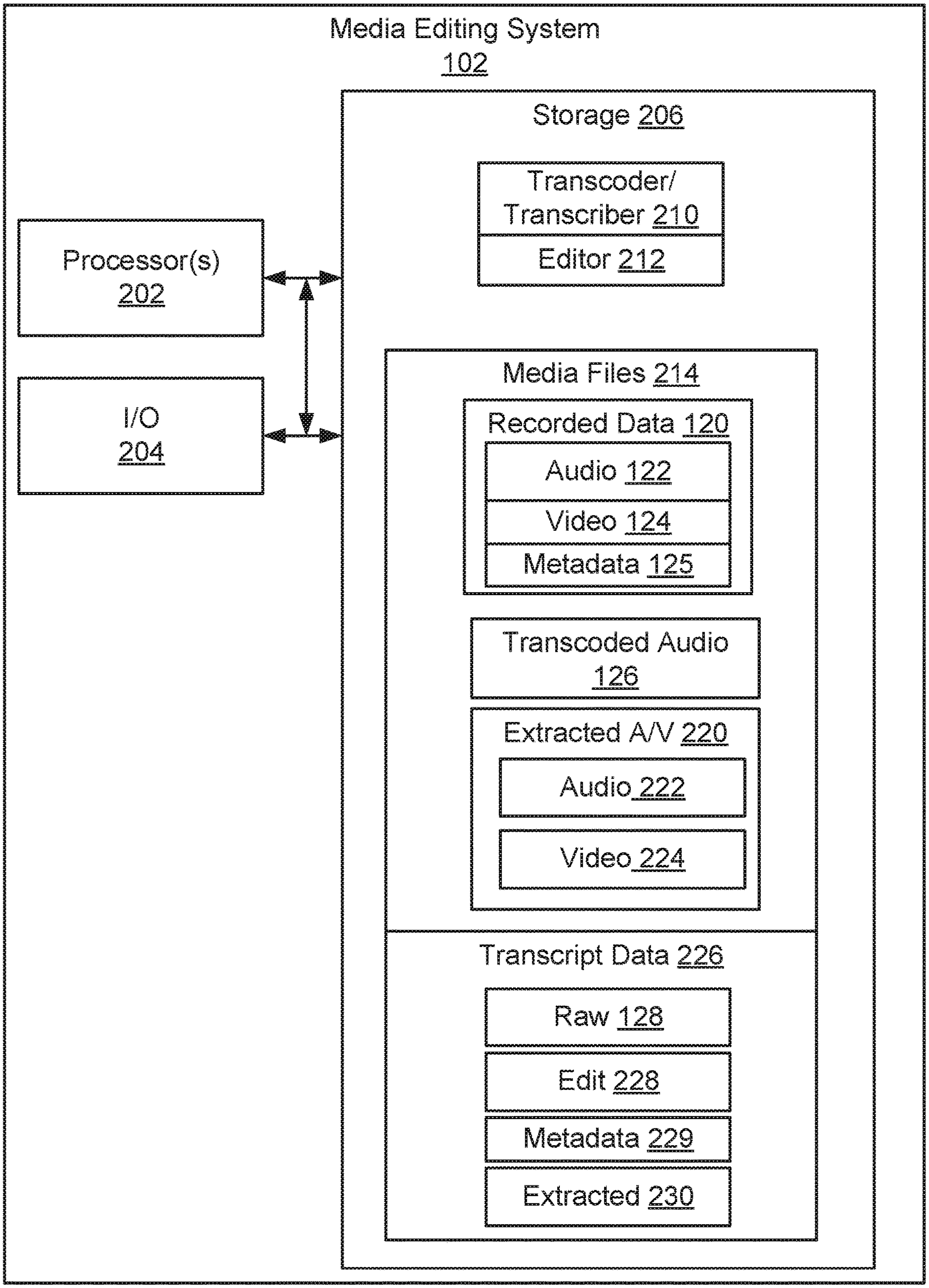
FIG. 2 is a schematic diagram of a media editing system according to example embodiments.

FIG. 2 illustrates a representative example of a media editing system 102 according to example embodiments. In the illustrated example the media editing system 102 is implemented on one or more server systems and includes one or more digital processors 202, non-transitory digital storage 206 and input/output (I/O) devices 204. Digital storage 206, which may for example include one or more different types of electronic storage elements, hard-drives and database systems, stores instructions that configure the processor 204 to operate to perform the functions described herein. As will be explained in greater detail below, computer instructions stored in storage 206 may, in various embodiments, include a transcoder/transcriber module 210 and an editor module 212. Storage 206 can also store data received through I/O devices 204 as well as data obtained or generated by the processor 202 operating under instructions from modules 210 and 212. I/O devices 204 include communications interfaces for exchanging messages and data with network 112. In example embodiments, the data stored on storage 206 includes media files 214 that can include, among other things, recorded data 120 received from media recording devices 106. In example embodiments, the storage 206 also stores transcribed data 226 which includes files that contain speech converted text and other information that has been derived from recorded data audio component 122.

In at least some example embodiments the media editing system 206 is configured by transcoder/transcriber module 210 to obtain transcript data 226 from the audio component 122 of a recorded data file 120. In this regard, in one example embodiment, the media editing system 206 is configured to transcode audio component 122 of a recorded data file 120 into a format that is optimized for S2T conversion. By way of example audio component 122 as received from media recording device 106 may be in a format or have a bit rate or other attributes that require adjustment to optimize transcription. By way of example, in one embodiment, transcoder/transcriber module 210 is configured to transcode audio component 122 from its existing format/bit rate into an MP3 file with a constant 128 kB bit rate in the form of transcoded audio file 126. In some example embodiments, transcoding is done locally at media editing system 102, however in some embodiments audio component 122 is provided to a transcoding service via network 112 and the resulting transcoded audio file 126 then returned back to media editing system 102. In some example embodiments, transcoding of the audio component 122 may be omitted such that transcoded audio file 126 and audio component 122 are the same file.

In some example embodiments, once a recorded data file 120 is uploaded, as part of the upload function (or subsequent to upload, as part of the transcoding function, for example) the media editing system 206 is configured to determine an audio quality factor for the audio component 122 of a recorded data file 120 that can be indicative of the convertibility of the audio to text. For example, the audio data may be sampled at multiple locations to determine if background noise frequencies or patterns dominate the audio track to an extent that the likelihood of an accurate S2T conversion is predicted to fall below an acceptable threshold. If the audio quality factor quality for an uploaded data file 120 falls below an acceptable threshold, feedback can be provided (for example, displaying an icon associated with the data file 120 with a red X through it in a user interface screen visible on user device 108), making the user aware that the recorded data file 120 is unlikely to result in high quality transcribed text data.

In example embodiments, the media editing system 102 sends transcoded audio file 126 over the network 112 to S2T system 104, which performs speech to text conversion on the transcoded audio file 126 and returns a corresponding raw transcript file 128 to the media editing system 102 that is stored as transcript data 226. Although raw transcript file 128 can take a number of different formats, in an example embodiment transcript file 128 is a JavaScript Object Notation ("JSON") file, which is a language-independent open data format that uses human-readable text to express data objects consisting of attribute-value pairs.

Figure 4:
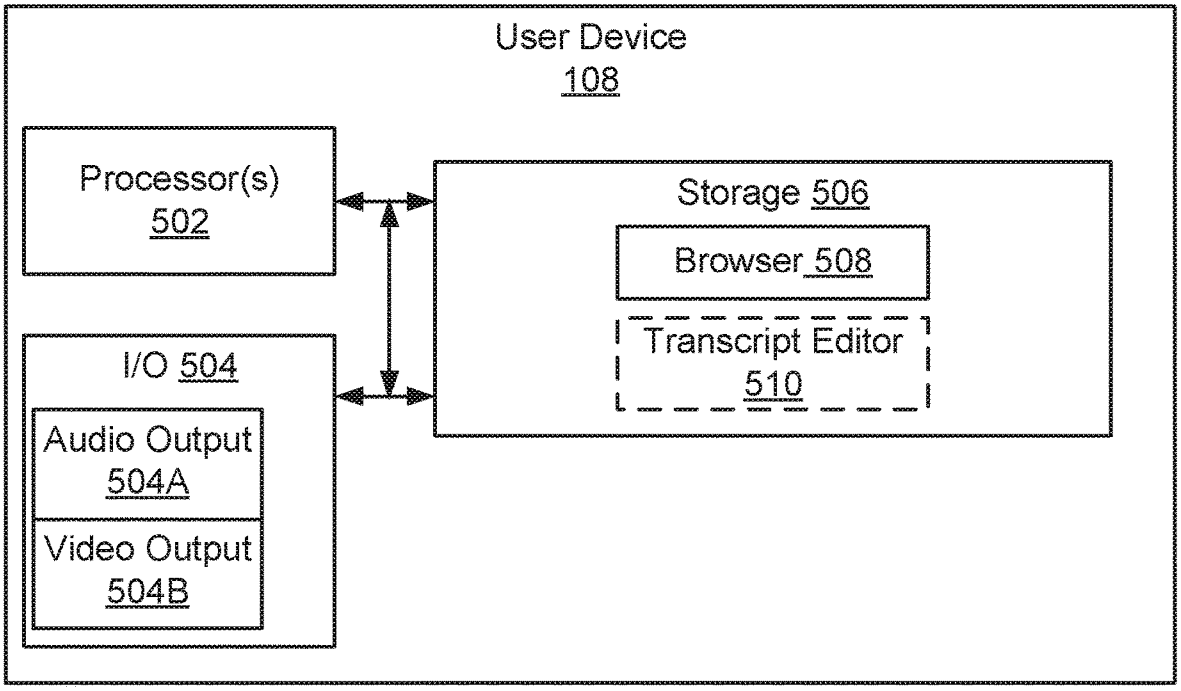
FIG. 4 is a schematic diagram of a user device according to example embodiments.

In example embodiments, editor module 212 configures media editing system 102 to allow user editing of transcript files 128. In at least one example embodiment, the editor module 212 configures media editing system 102 to function as a server hosted editing application that is accessible to remote client user devices 108 through network 112. In this regard, FIG. 4 illustrates a representative example of a user device 108. In the illustrated example the user device 106 includes one or more digital processors 502, non-transitory digital storage 506 and input/output (I/O) devices 504. Digital storage 506, which may for example include one or more different types of electronic storage, stores data captured through I/O devices 504 as well as instructions that configure the processor 502 to operate to perform the functions described herein. I/O devices 504 include user input interfaces such as touch screens and buttons, user output interfaces such as display screens and speakers, communications interfaces for exchanging messages and data with network 112. In an example embodiment, the user device 108 includes a browser application 508 that allows the user device 108 to access the transcript editing functions of media editing system 102 through network 112 as a client device.

In some example embodiments user device 108 is implemented on a multi-purpose device such as a smart phone, tablet, smart watch, laptop computer, desktop computer or other computer device. As noted above, in some embodiments, media recording device 106 and user device 108 are combined and implemented on a single user equipment device 110.

The above description provides an example of a possible operating environment in which aspects of a media generating and editing system can operate. Such an overview having been provided, an example of a possible workflow for the media generating and editing system will now be provided with reference to the system components of FIGS. 1-4 and user experience examples as presented in the remaining Figures.

In an example embodiment, the workflow begins with a user (an interviewer in the present example) making a digital audio recording of an interview with an interviewee using the A/V capture application 408 of media recording device 106. In order to provide context for describing the present example, FIG. 5 illustrates the content of a manual transcription 520 of the first two lines of the interview, in which the male interviewer is labeled as "Jeff K", and the female interviewee is labeled as "Kim R". As can be seen in the transcription 520, "Jeff K" makes a 15 word statement that includes a question, which is followed by a 6 word answer made by "Kim R". In the example embodiment, the interview continues for 18 minutes. At the conclusion of the interview, a recorded data file 120 with an audio component 122 (in the presently describe example, an MP3 file) is stored in storage 406 of the media recording 106 device for uploading to media editing system 102. In one example embodiment, the interviewer causes media recording device 106 to send the recorded data file 120 (which may for example be an MP3 file) to the media editing system 102 as an attachment to an email or other message. In some example embodiments, the media recording device 106 has a browser application which the interviewer can access to use an upload interface hosted at media editing system 102 to upload the recorded data file 120. In some examples, the media recording device 106 may have a resident client transcription application 410 that has been provided by the operators of the media editing system 102 and that provides an upload interface to media editing system 102. Furthermore, although the above examples contemplate uploading of recorded data file 120 to media editing system subsequent to the completion of a recording session, in some example embodiments the recorded data could be uploaded in batches throughout the interview process, or may be streamed in real time during recording to the media editing system 102.

In some embodiments where the media recording device 106 includes a client transcription application 410 such application may include a user interface that allows metadata 125 to be refined or augmented with, for example, names of interview participants, interview location (which may include one or both of user entered data and GPS location information), interview title, time and date information, and local environmental data such as precipitation, temperature, wind conditions as measured by the recording device or retrieved from on-line weather sources.

In some example embodiments, recorded data file 120 is transferred from media recording device 106 using network 112 or a physical medium such as a USB memory stick to user device 108, and upload to the media editing system 102 is then carried out between the user device 108 and the media editing system 102.

As described above, once recorded data file 120 is uploaded to media editing system 102 audio component 122 may be transcoded, in at least some example embodiments, into a format that is optimized for S2T conversion, and the resulting transcoded audio file provided by the media editing system 102 to S2T system 104 which then returns raw transcript data 128 to the media editing system 102, which in the presently described embodiment is a JSON file. FIG. 6 illustrates an excerpt of the raw transcript data 128 that corresponds to the two lines shown in FIG. 5. The raw transcript data 128 includes file header metadata 602 that includes a job identifier, file name, total transcript duration (in seconds) and a creation date stamp. Additionally, the raw transcript data 128 includes a "speakers" array 604 and a "words" array 606.

The "speakers" array 604 includes a plurality of objects (605-1, 605-2, 605-3), which each include a plurality of attribute:value pairs. In the illustrated example, S2T text system 104 generates a new object in "speakers" array 604 for each instance where S2T text system 104 detects a speaker transition, and each object 605-1, 605-2, 605-3 includes attribute:value pairs that define: (1) the speaker—"name"; (2) the time into the recording that the speaker started speaking—"time"; and (3) the duration that the speaker speaks until transition to a different speaker "duration". FIG. 6 also includes a speaker "confidence" attribute, which is not active in the illustrated "speaker" array example, but can be used to illustrate a level of confidence that the S2T text system 104 has in the "name" attribute. The values assigned to the "name" attribute in the speakers array 604 can for example be M1, M2, . . . Mn or F1, F2, . . . Fn to identify a male speaker 1, male speaker 2, female speaker 1, female speaker 2, etc. Accordingly, the "speakers" array 604 in FIG. 6 indicates that male speaker 1 speaks at 6.067 seconds into the interview for a duration of 3.601 seconds (object 605-1), followed by male speaker 2 at 9.668 seconds into the interview for a duration of 2.250 seconds (object 605-2), returning again to male speaker 1 at 11.918 seconds for a duration of 112.452 seconds (object 605-2).

It will be noted for future reference from the manual transcript 520 of FIG. 5 that the speaker data in array 604 is actually incorrect as the interview includes only two speakers, a male M1 and a female.

The "words" array 606 also includes a plurality of objects (607-1, 607-2, . . . , 607-23), which each include a plurality of attribute:value pairs associated with a specific transcribed word. In the illustrated example, S2T text system 104 generates a new object in "words" array 606 for each instance where S2T text system 104 detects a new word or punctuation character, and each object 607-1, 607-2, . . . , 607-23 includes attribute: value pairs that define: (1) the detected word or punctuation symbol—"name"; (2) time into the audio file that the word commences—"time", in seconds; (3) duration of the audio associated with the word—"duration" in seconds; and a confidence level, on a scale of 0-1, that the word has been correctly transcribed—"confidence". For example object 607-2 specifies that the audio word that has been transcribed as the text word "has" is spoken commencing at 7:737 seconds into the interview recording, has a duration of 0.330 seconds, and S2T text system 104 has a 70% confidence that "has" is the correct transcribed text word that corresponds to the audio word that was contained in the audio data. Object 607-7 shows an example of an object representing a punctuation mark.

In example embodiments, the raw transcript data 128 provided by the S2T system 104 may not be in an optimized format for use by the editor module 212 of the media editing system 102. For example, in raw transcript data 128, the speaker information and transcribed word information are spread out over two arrays 604 and 606, which may not permit the most efficient processing in a cloud based client-server editing environment. Accordingly, in an example embodiment, media editing system 102 is configured by one of transcoder/transcriber module 210 or editor module 212 to convert received transcript data 128 into edit data 228 that is optimized for editing. In this regard, FIG. 7 illustrates the transcript excerpt of FIG. 6 as converted by media editing system 102 into edit data 228, which in the example embodiment is also a JSON file.

In the edit data 228 of FIG. 7, the header information 702 includes, among other things, a file identifier (ntVaOiv0S92Jash5UzMx1g.mp3) that identifies the transcoded audio file 126 that the transcript has been derived from, as well as title metadata (kim r.mp3), and other file and user identification information. In the illustrated embodiment, as part of the optimization process, the information found in "speakers" array 604 of raw data file 128 is incorporated, by correlating the timing information in the arrays 604 and 606, into the "words" array 706 of edit data 228. The "speakers" array 604 is replaced in edit data 228 with an object 704 that provides a table that allows speaker names to be associated with speaker variables, which will be discussed in greater detail below.

As can be seen in FIG. 7, "words" array 706 in the edit data 228 includes a greater number of attribute:value pairings for each of the objects 705-1 to 705-20 to allow for enhanced editing features. In particular, although many different types of attributes are possible, in the illustrated example, the following pairings are provided in the object for each transcribed word:

"duration": (milliseconds)
"confidence": (0-1)
"name": (string representing the transcribed word)
"time": (milliseconds)
"speaker": (string and id)
"para": (string p1-pn)
"strike": (true/false)
"highlight": (true/false)
"comment": (string)

In at least some example embodiments, an additional pairing "parcomment": (string) is also included for each object.

As can be seen from comparing the data of FIG. 7 to that of FIG. 6, as part of the optimization process carried out by media editing system 102, punctuation marks are not accorded a separate object entry in the "words" array 706 but rather are included as part of the immediately proceeding word object entry. By way of example, raw transcript data 128 included object 607-6 for the word "in", and object 607-7 for the period "."; in optimized data 228, the period has been incorporated into the object for "in", such that objects 607-6 and 607-7 have been replaced with a single object 705-6 for the word/punctuation combination "in."

It will further be noted that the second based timing in raw data 128 has been replaced with millisecond based timing in edit data 228 in order to minimize processing of decimal level numbers.

The edit data 228 includes paragraph attribute ("para") associating each word object with a paragraph in the transcribed text. In the illustrated embodiments, a new incremented "para" value is set whenever the timing data from raw data speaker array 604 indicates a speaker transition; for example, the initial word object 705-1 has a "para" value of "p0" and a "speaker" value of "M1"; as illustrated at object 605-2 of raw data 128, at "time": 9.668 s, the "speaker" value transitions to "M2", and accordingly in corresponding word object 705-7 in edit data 228, the "para" value is incremented to "p1" and the "speaker" value set at "M2"; as illustrated at object 605-3 of raw data 128, at "time":11.918 s, the "speaker" value transitions back to "M1" and accordingly in corresponding object 705-12 in edit optimized data 228, the "para" value is incremented to "p2" and the "speaker" value set at "M1".

The attributes "strike", "highlight", "comment" and "parcomment" are provided to support editing functions as described below. The attribute value parings associated with each transcribed word as set out above are merely examples of one possible embodiment; in various alternative embodiments more or fewer attributes can be provided.

Figure 8:
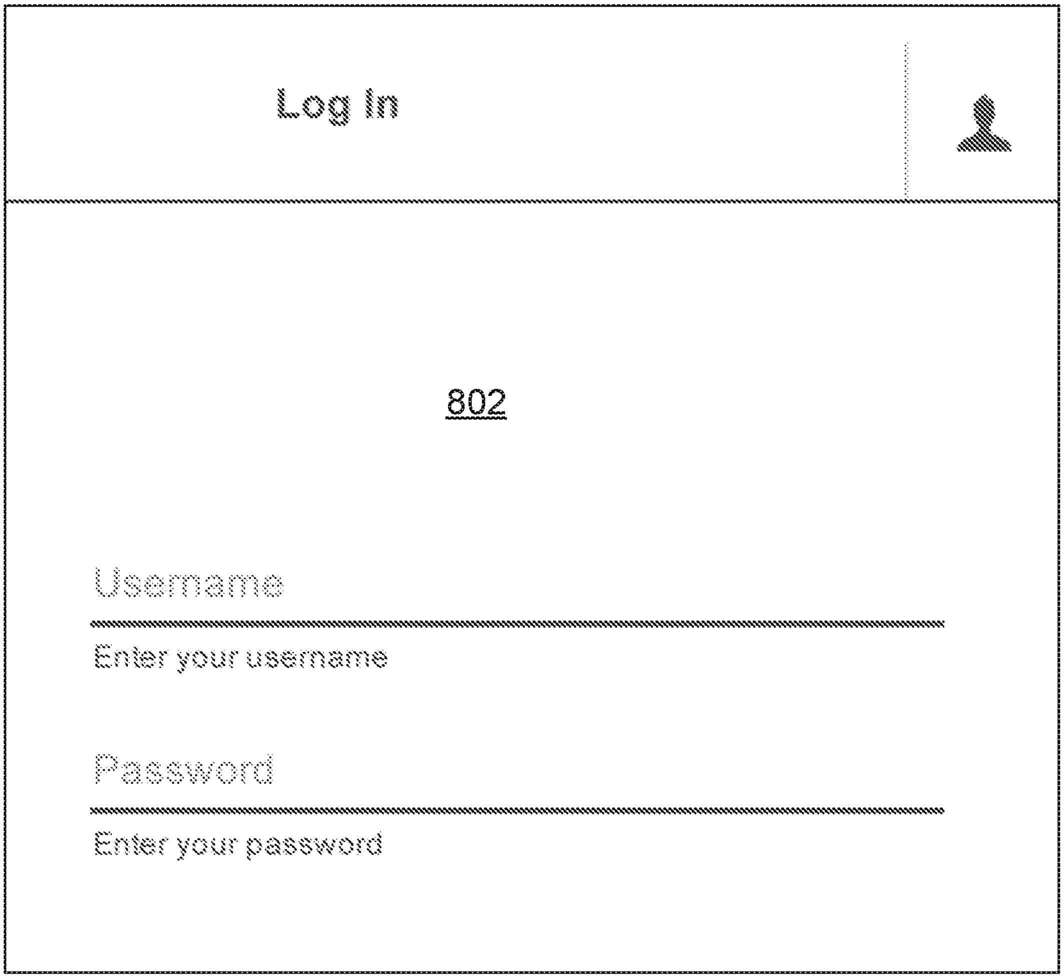
FIG. 8 shows a log-in UI screen according to an example embodiment.
Figure 9:
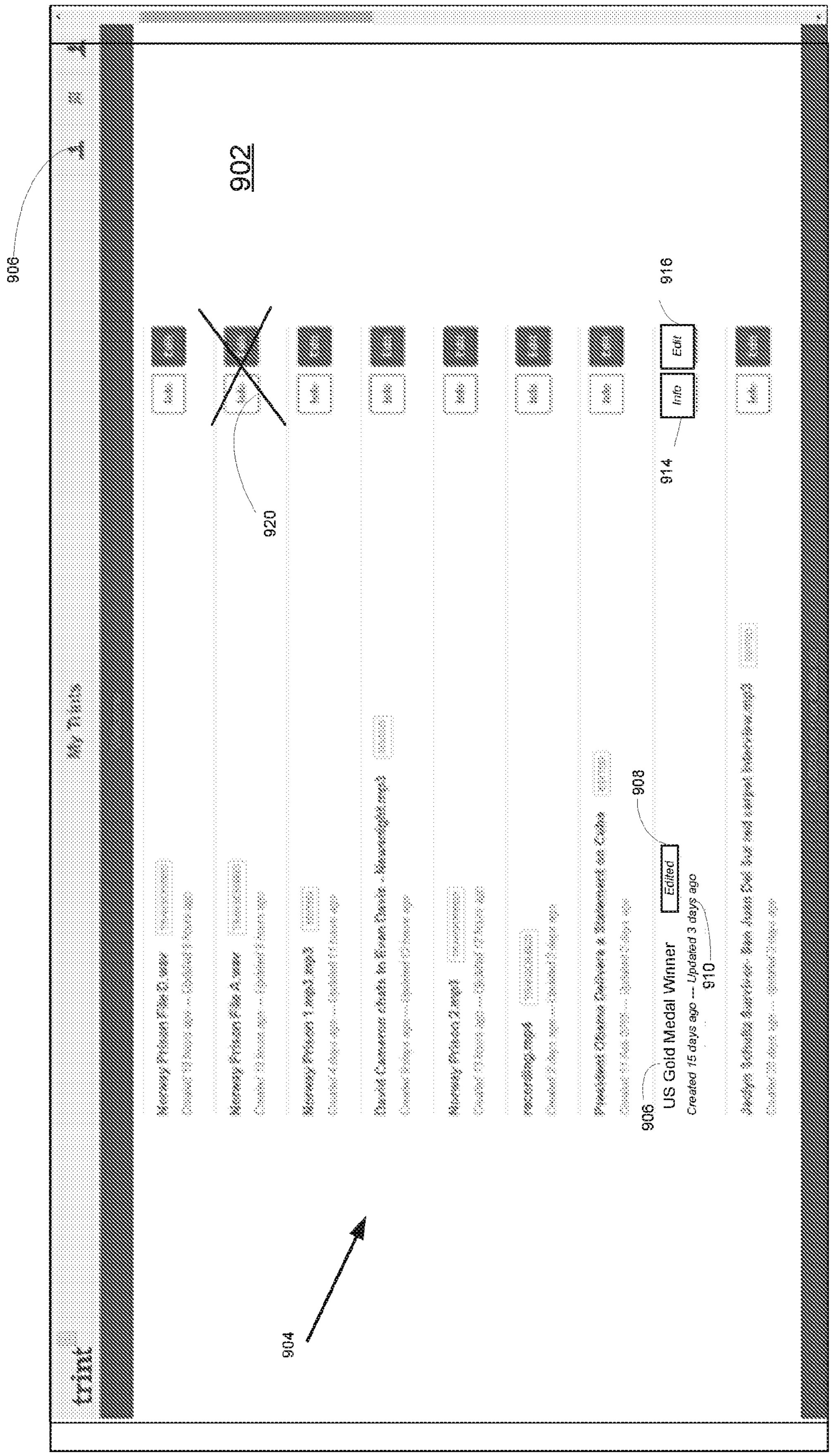
FIG. 9 shows a UI screen that lists transcribed data files according to an example embodiment.
Figure 10:
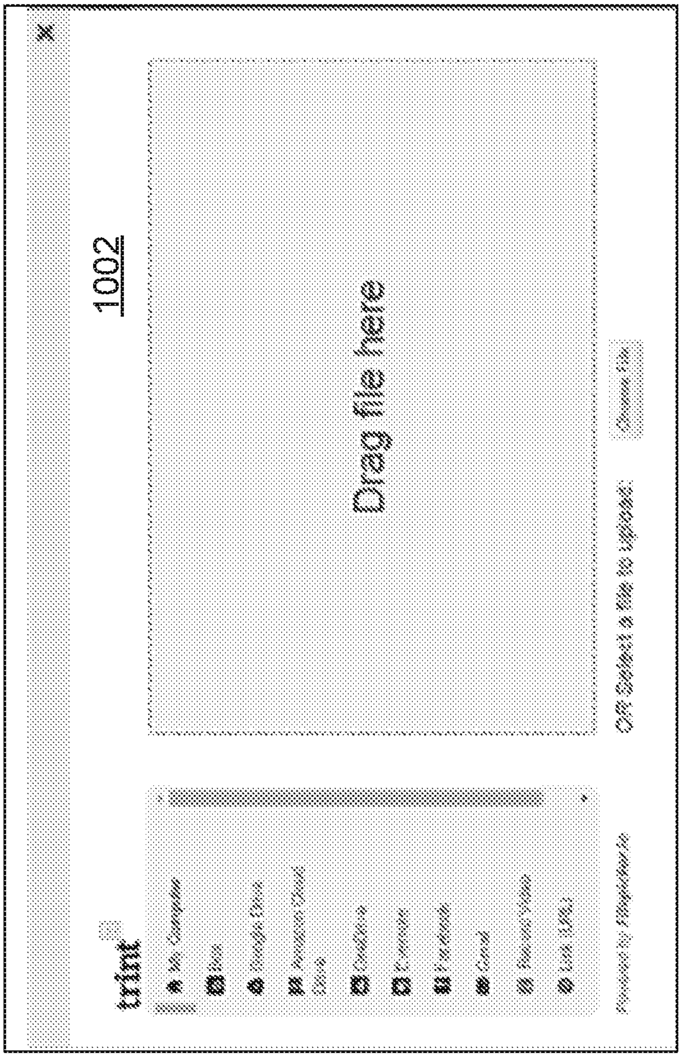
FIG. 10 shows a UI upload screen according to an example embodiment.

In example embodiments, media editing system 102 is configured by editor module 212 to allow a remote user device 108 to user local browser application 508 to access and modify edit data 228 through network 112. In this regard, the user experience of a person using user device 108 to access media editing system 102 through a local browser application 508 will now be described. FIG. 8 illustrates a secure log-on page 802 to media editing system 102 as presented by a browser application 508 on a display screen 504B of user device 108. As seen in FIG. 9, in an example embodiment, after a registered user logs on, the user is then presented with a user interface (UI) screen 902 that presents a list 904 of the transcribed edits files 228 that are associated with the user and the user is authorized to access. The UI screen 902 includes an upload button 906 that allows a user to upload recorded data 120 to the media editing system 102 for editing, and in this regard, FIG. 10 displays an example of an upload dialog box 1002 that is displayed on the user device screen 504B when upload button 906 is selected. As can be seen from FIG. 10, upload dialog box 1002 presents a number of options for drag-and-drop upload selection of a recorded data file 120. Once a recorded data file 120 is uploaded to media editing system 102 it is processed in the manner described above to obtain transcript data 226 and added to the file list 904 that is displayed in UI screen 902 of FIG. 9. As noted above, in some example embodiments the media editing system 102 may be configured to determine an audio quality factor for the audio component 122 of an uploaded recorded data file 120. In some example embodiments, a file that fails to meet an audio quality threshold suitable for a threshold transcription threshold may be marked with a visual indicator in the list 904, with an X 920 for example. As shown in FIG. 9, each of the edit data 228 files in displayed list 94 are identified by a title field 906 (for example "US Gold Medal Winner", which corresponds to the interview data illustrated in FIGS. 5 to 7), and include the following associated status fields: (1) creation/edit date field 910 which indicates when the edit file 228 was first created and last edited in media editing system 102 (for example the field may display "Created 15 days ago—Updated 3 days ago); and (2) Transcription/Edit field 908 which indicates if the edit file 228 is newly transcribed or has been previously edited by a user (for example the field 908 may display "Transcribed" to indicate a file for which media editing system 102 has produced new edit data 228 for but which has not yet been edited by a user, and display "Edited" to indicate a file that has been previously edited by a user. In example embodiments, the information used to display the elements of list 904 is created by media editing system 102 and stored as metadata 229 in the storage 206. Metadata 229 is updated by the media editing system whenever a new edit data 228 file is added the system or an existing file is edited, and functions as an index to the information stored as transcript data 226 by the media editing system 102. In some example embodiments metadata 229 is stored in a separate storage location than the files that make up edit data 228.

Figure 11:
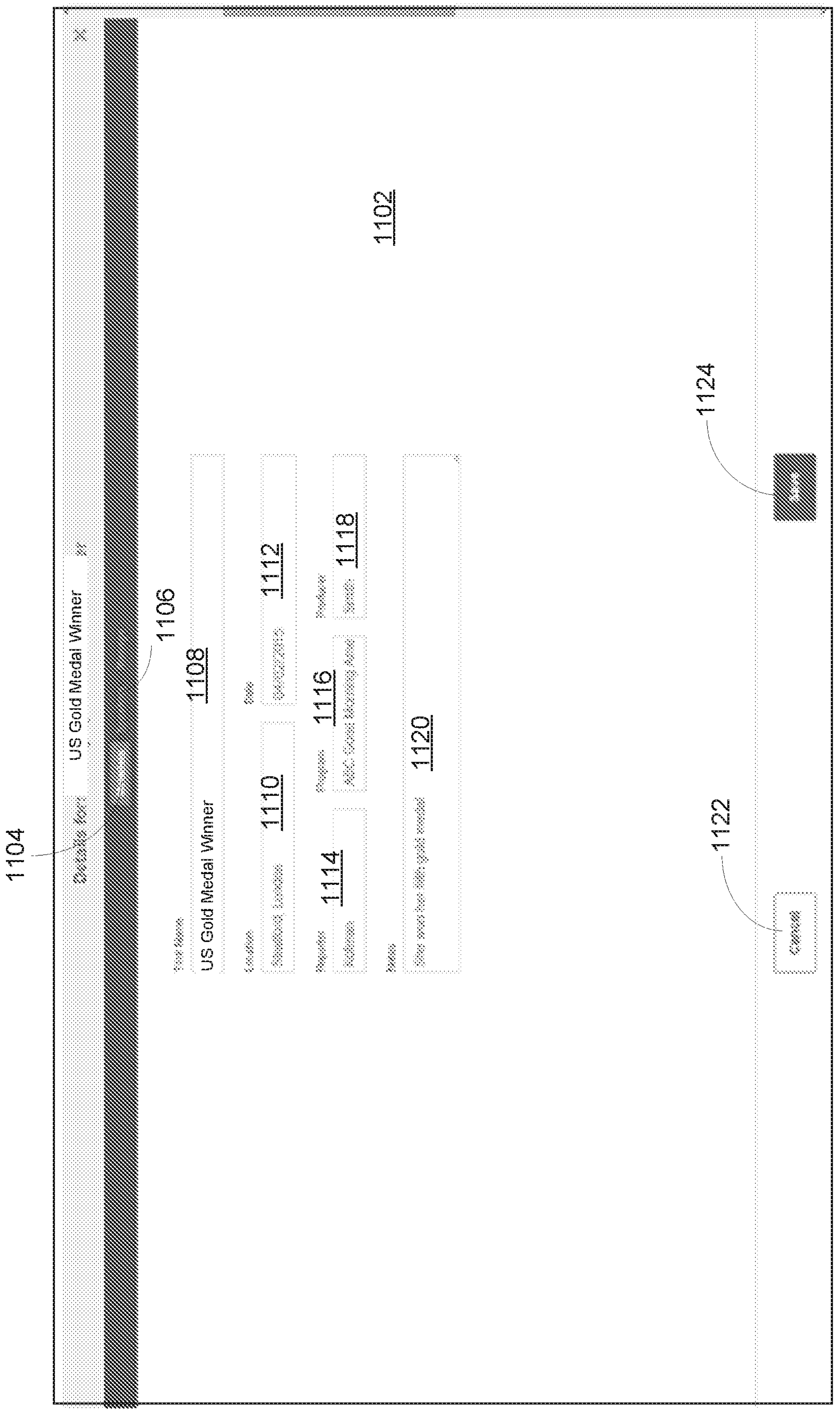

As seen in FIG. 9, an "Info" button 914 and an "Edit" button 916 are also displayed in association which each item in list 904. The "Info" button allows a user to view and edit selected portions of the metadata 229 associated with the associated edit data 228 file. In this regard, FIG. 11 shows a UI screen 1102 that is displayed for a list item when its associated "Info" button 914 is selected. The top of the screen include user selectable buttons "Metadata" 1104 and "Speakers" 1106 that allow different elements of metadata 229 to be viewed and edited. In FIG. 11, the "Metadata" button 114 has been selected, and the following user editable fields are presented: (1) Transcript Name 1108 (for example "US Gold Medal Winner"); (2) Location 1110 (location of the interview, for example "Stratford, London"); (3) Date 1112 (date of the interview, for example "4 Feb. 2015"); (4) Reporter 1114 (the name of the reporter conducting the interview, for example "Kofman") (5) Program 1116 (the name of the program that the interview will be aired on, for example "ABC Good Morning America") (6) Producer 1118 (the name of the producer, for example "Smith") and (7) Notes 1120 (misc. information about the interview, for example "She won her fifth gold medal"). UI screen 1102 also includes a "save" button 1124 that allows the user to save any changes made to the metadata fields and return to UI screen 902 and a "cancel" button 1122 that allows a user to return to US screen 902 without any save function. The media editing system 102 is configured to update metadata 229 accordingly when the "save" button 114 is selected.

Figure 12:
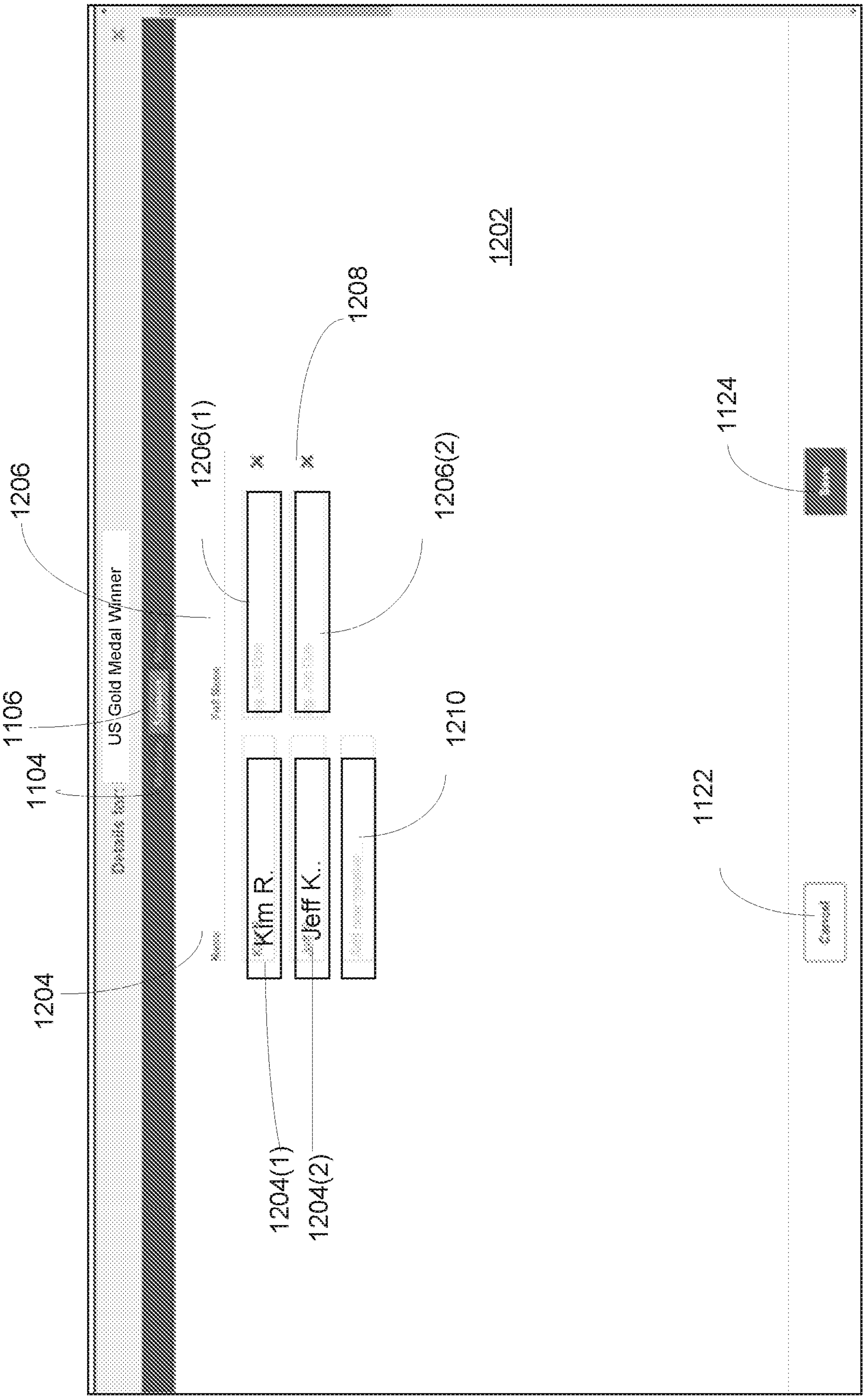

FIG. 12 illustrates a metadata UI screen 1202 that is displayed when the "Speakers" button 1106 is selected, which includes user editable "name" and "full name" fields 1204, 1206 that can be used to specify shortened forms and the full names of the individuals that participated in the interview—for example "Kim R" in shortened name field 1204(1), and "Jeff K." in shortened name field 1204(2) with "Jeffrey Kofman" in the associated full name field 1206(2). A delete button 1208 is provided to remove a speaker's shortened and full name, and an "Add" button 1210 provided to add fields for additional speakers. UI interface 1202 also includes "cancel" and "save" buttons 1122, 1124 that have the functionality described above.

Turning again to UI screen 902 of FIG. 9, selection of the "edit" button associated with an interview entry from list 904 results in the transcribed text from the interview (and in particular from the edit data 228 file) being displayed with certain editing and audio playback functions on user device screen 504A. In this regard, FIG. 13 displays edit UI screen 1300 that shows text corresponding to the transcript data shown in FIG. 7. When generating UI screen 1300, media editing system 102 combines information from metadata 229 and edit data 228 file to create the HTML code necessary for the content of UI screen 1300. In example embodiments, the UI screen 1300 is used to display transcribed text in synchronization with playback through an audio output 504A of the user device 504 of the audio component 122 of the recorded data 120 from which the displayed text was derived. Accordingly, the media editing system 102 relies on the timing data (words start time and word duration) in each word object of the edit data 128 to coordinate the presentation of audio recorded data 120 over device audio output 504A with the transcribed text words displayed on UI screen 1300. In example embodiments where audio component 122 has been modified to provide transcoded audio 126, the transcoded audio 126 may be the actual audio data provided to user device 108.

UI Screen 1300 includes a region near the top of the screen that displays information fields populated with data derived from metadata 229, including: (1) Transcript Name 1302 ("US Gold Medal Winner"); (2) Reporter 1304 ("R: Kofman"); (3) Producer 1305 ("P: Smith"); (4) Location 1306 ("L: Stratford, London"); and (5) Date 1308 ("D:2015 Feb. 4). The transcribed text words from data 228 is displayed in a scrolling display region 1310 of the UI screen 1300, and is broken into physical paragraphs based on the "paragraph:value" attribute pairing data associated with each word object in edit data 228. As noted above, in edit data 228, the "paragraph:value" attribute pairings have been determined based on perceived speaker transitions. In order to allow each speaker to be identified, each text paragraph is preceded by a speaker ID box 1312, which are initially blank in the illustrated embodiment. As can be seen in the example illustrated in FIG. 7, the words in the phrase "So has has it sunk in." are all associated with speaker M1 and para P0, and accordingly are presented together as a separate paragraph in UI screen 1300. Similarly, the words in the phrase "Five medals in five games." are all associated with speaker M2 and para P1, and accordingly are presented together as a separate paragraph in UI screen 1300.

In example embodiments, the media editing system 102 works with user device 108 to enable word-aligned audio-linked-to-text editable transcripts. UI screen 1300 displays a number of on-screen indicators or markers to facilitate this functionality, including an audio tracking indicator 1330 that highlights the displayed word that correlates to the audio being played back at that instant. In the illustrated example, user interface 1300 provides a "play/pause button" 1314 for activating audio playback of the aural data associated with displayed words. When in pause mode, activating "play/pause button" 1314 will cause audio playback to start at a time in audio file that corresponds to the timing data associated with the onscreen word highlighted by audio tracking indicator 1330. During audio playback, the audio tracking indicator 1330 advances word by word throughout the displayed text to provide synchronized feedback to a user of how each recorded spoken word has been transcribed to its text equivalent. Activating "play/pause button" 1314 during audio playback causes audio playback and movement of the audio tracking indicator 1330 to both pause.

In an example mechanism, audio playback (and the corresponding movement of audio tracking indicator 1330) can be activated in response to user selection of a word. For example, a simple point and click input can be used to start audio playback by placing the on-screen navigation marker 1301 on a desired starting word and providing a single click input. In a touch screen environment, a word can be selected by touch. In a speech controlled device, a word can be selected by speaking it. Once a word is selected, the audio tracking indicator 1330 jumps to the selected word and audio playback commences from the corresponding audio location. In example embodiments, as the audio indicator 1330 progresses, an audio start indicator 1328 highlights the word that was selected to start the audio playback so that the user can easily see what segment of text they have listened to—thus, in the example of FIG. 13, audio start indicator 1328 indicates that audio playback commenced with selection of the word "in" and has progressed to the word "sunk" that is highlighted by audio tracking indicator 1330.

In the displayed embodiment, user interface 1300 includes a "replay" button 138 which when selected causes audio playback and the corresponding location of audio indicator 1330 to be pushed back a predetermined duration (and corresponding number of words), for example 5 seconds, and started from that point.

In the illustrated embodiment, an audio waveform 1320 is presented on the UI screen 1300 along with a "total length" indicator 1334 that indicates the entire length of the interview that is being reviewed (18:06 in the present example). Audio waveform 1320 graphically represents the varying volume levels throughout the entirety of the interview duration. In at least some embodiments, an audio start marker 1324 is displayed on audio wave 1320 to indicate the relative location of onscreen audio start indicator 1328 within the total duration of the interview, and an audio tracking marker 1322 is similarly displayed on audio wave 1320 to indicate the relative location of onscreen audio tracking indicator 1330. In the displayed example, sidebar 1326 is also provided that includes a progress marker 1327 representing the relative location (indicated by vertical location of progress marker 1327) and quantity of the displayed words (indicated by the vertical height of the marker 327) relative to the length of the entire transcript. While the audio wave markers 1324, 1322 are positioned based on timing data associated with the highlighted words, the progress marker 1327 is positioned based on location and quantity of the currently on-screen displayed words relative to the total number words in the transcribed file being viewed/edited.

In example embodiments, audio start indicator 1328 and audio tracking indicator 1330 may take a number of different visual forms. By way of example they could each comprise highlighting the subject word with a different color (e.g. yellow highlight for audio tracking indicator 1330 and blue highlight for audio start indicator 1328).

Figure 13:
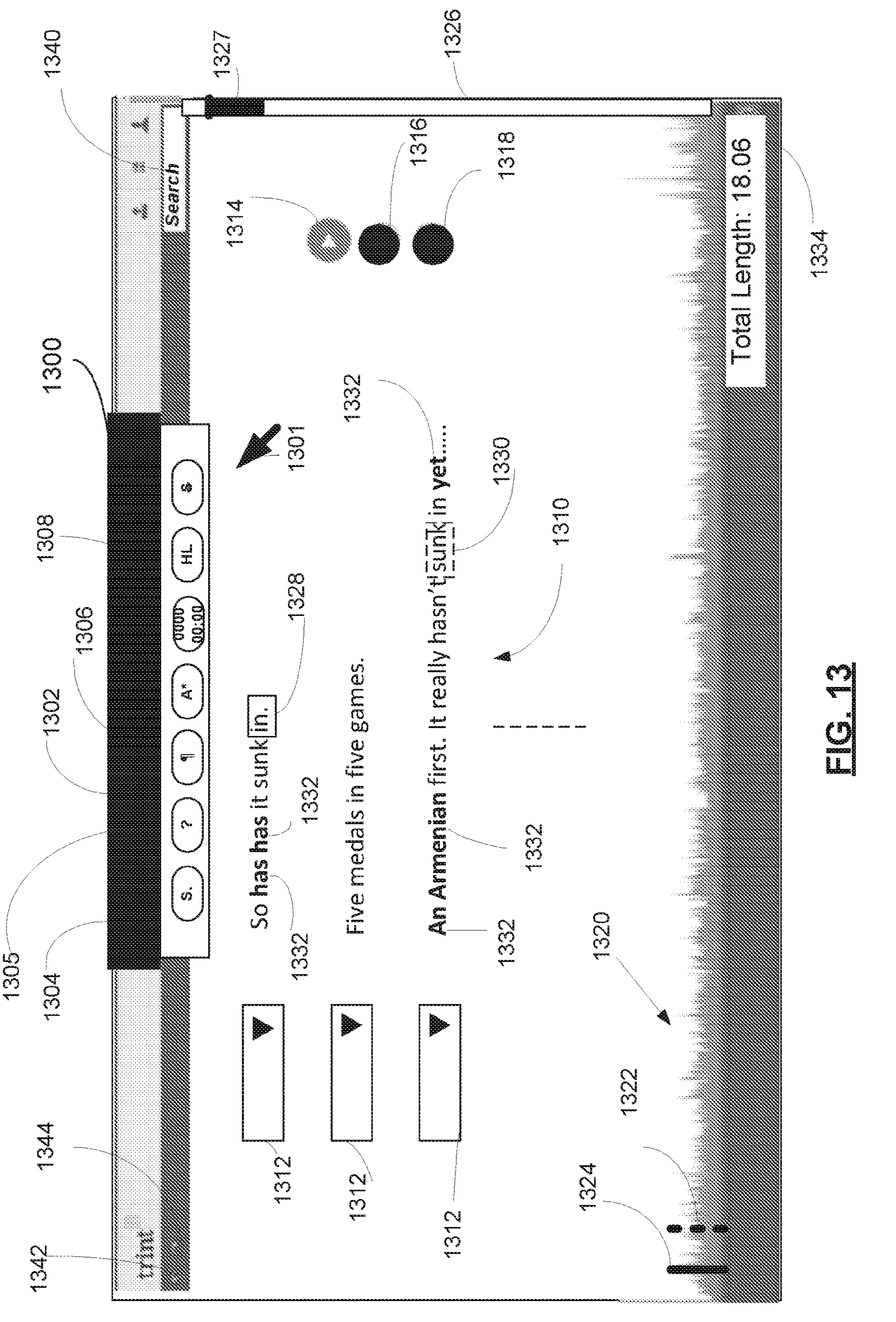

In example embodiments, another on-screen indicator provided on UI interface 1300 is confidence indicator 1332. In particular, each word that has an associated confidence level that is below a predetermined threshold is marked or otherwise highlighted so that low-confidence words can quickly be visually distinguished from the remaining displayed words that have confidence levels that are above the threshold. In one example embodiment, low confidence words are shown in red text and high confidence words are shown in black text. In FIG. 13, low confidence indicator 1332 takes the form of bold lettering, and the confidence threshold has been set at 0.975 (97.5%), resulting in bold highlighting of the following words: "has" (p0, 69.67% confidence); "has" (p0, 77.37% confidence); "An" (p2, 58.4% confidence); "Armenian" (p2, 59.8% confidence) and "yet" (p2, 56.9% confidence). In at least some example embodiments, the confidence threshold is user configurable.

In example embodiments, the system includes a speed editing tool that is triggered by a quick edit button 1318. In particular, selection of quick edit button 1318 causes an edit box 1329 to be positioned at the next "low confidence" word in the transcript following the audio start indicator 1328. Furthermore, audio playback automatically triggered for a duration that commences a predetermined time or number of words prior to the indicated low confidence word and ends a predetermined time or number of words after the indicated low confidence word.

Figure 14:
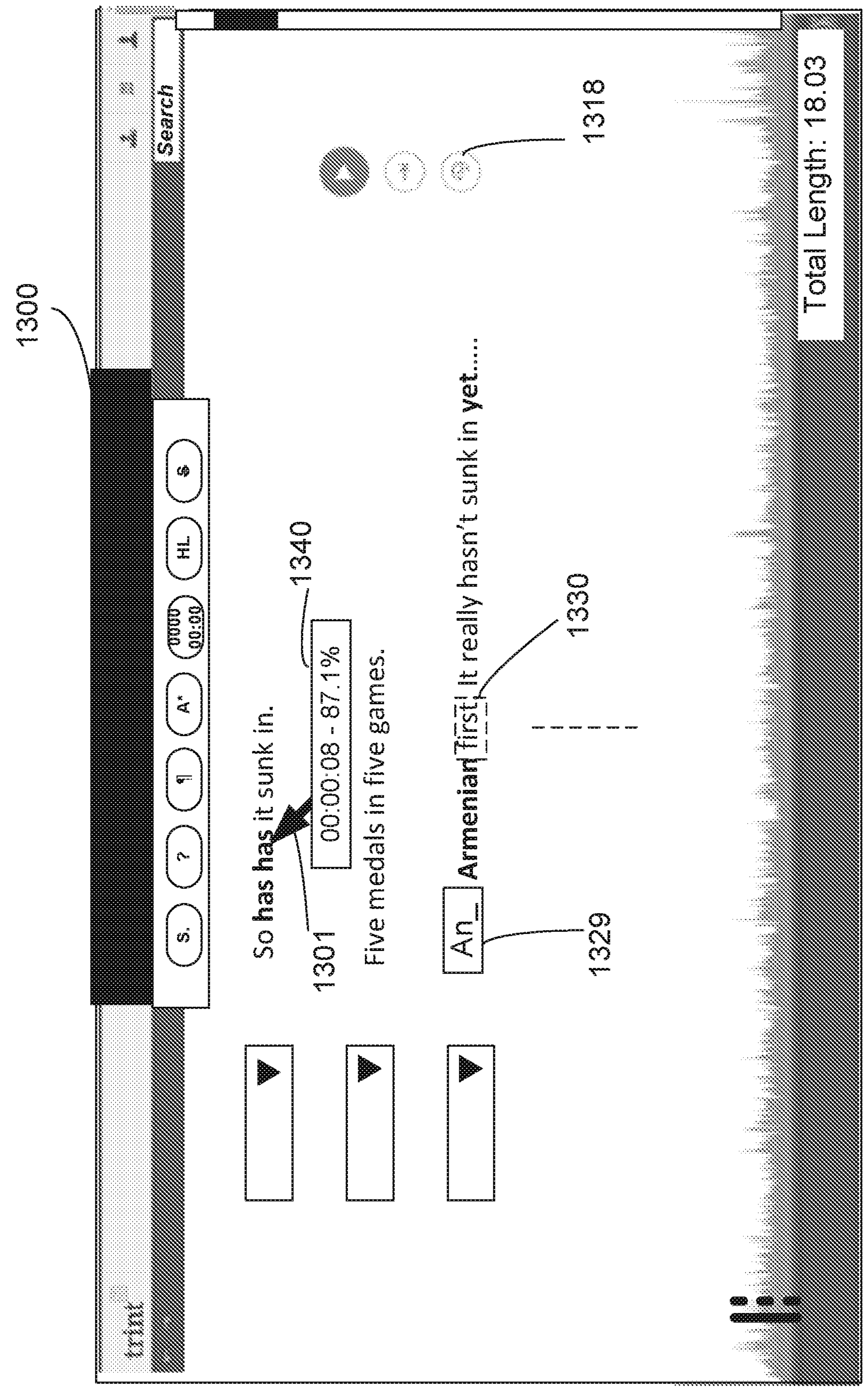

By way of example, in one embodiment the user device 108 plays back the audio that corresponds to five words, including the two words prior to the indicated word, the indicated word, and the two words after the highlighted word. In this regard, FIG. 14 provides a representation of what occurs when quick edit button 1318 is selected when the audio start indicator 1328 location shown in FIG. 13. In particular the edit box 1329 is automatically positioned at the next low confidence word, which in the illustrated example is "An"; furthermore, the edit box 1329 includes an edit cursor positioned next to the text within the edit box 1329; additionally, five words of audio are played, namely "five games. An Armenian first", with audio cursor 1330 highlighting the words as they are played. As a result of the audio and visual feedback, a device user is provided with contextual information to aid them in deciding quickly and efficiently if the low confidence word in text edit box 1329 is correct or not. If the word is incorrect, the cursor in the edit box 1329 allows the user to immediately correct the word, after which the change is displayed on UI screen 1300 and communicated back to media editing system 102 so that the corresponding word in edit data 228 can be updated to its corrected state. Alternatively, if the user decides that the word is in fact correct, selecting the quick edit button 1318 causes the text edit box 1329 to jump to the next low-confidence word and the above process is repeated. In one example embodiment, once a low-confidence word has been viewed in text edit box 1329 the confidence value for the word will be upgraded to 100%, regardless of whether the word has been edited or not, and the word will be displayed as a normal word without low-confidence indicator 1332. The upgraded confidence value will be communicated to system media editing system 102 to update the corresponding edit data 228.

In example embodiments, when a string of 2 or more low conference words are immediately adjacent to each other the entire string of adjacent words will be placed in an edit box 1329 for to allow editing of all the words in the string as multiple low confidence words in string is indicative of a transcription error that spans multiple words. By way of example, the two low confidence words in the first line of the transcript of FIG. 14, "has has" would be included in a single edit box 1329 for editing.

Accordingly, in example embodiments, quick edit button 1318 provides a mechanism by which a user can easily tab directly to the next occurrence in the transcript text of a low confidence word; listen to the audio context of the word; determine if the word needs to be corrected, and if so simply edit the word using the automatically positioned cursor; and then tab on to the next low confidence word using button 1318.

In some example embodiments, the user interface 1300 will display the timing and confidence information associated with a specific word temporarily when a predetermined user interaction with word occurs, for example when the navigation pointer 1301 hovers over the word for a predetermined duration (for example 1 second). In this regard, FIG. 14 illustrates a box 1340 that is presented on UI screen 1300 after navigation tool 1301 has been placed over the second occurrence of the word "has" in the first paragraph, resulting in the display of box 1340 near the subject word that contains a time stamp indicating the time associated with the word (8 seconds into the interview) and the confidence level associated with the word (87.1%).

As noted above, quick edit button 1318 can be used to jump to the next low confidence word and place it into and edit box 1329 for editing. In example embodiment, individual words can be selected for editing by a predetermined user input action—for example, navigation tool 1301 can be used to select a word and double clicked, following which the selected word is presented in an edit box 1329 for editing. It will be noted from the above description that the different user navigation input actions has different results—a single click on a word highlights it with indicators 1328 and 1330 and commences audio playback from that word; a double click opens a edit box 1329 for editing the word. Different user input actions may be used to trigger activities in alternative embodiments or configurations—for example, single click and double click actions can be replaced with single tap and double tap actions in a touch screen environment.

Figure 15:
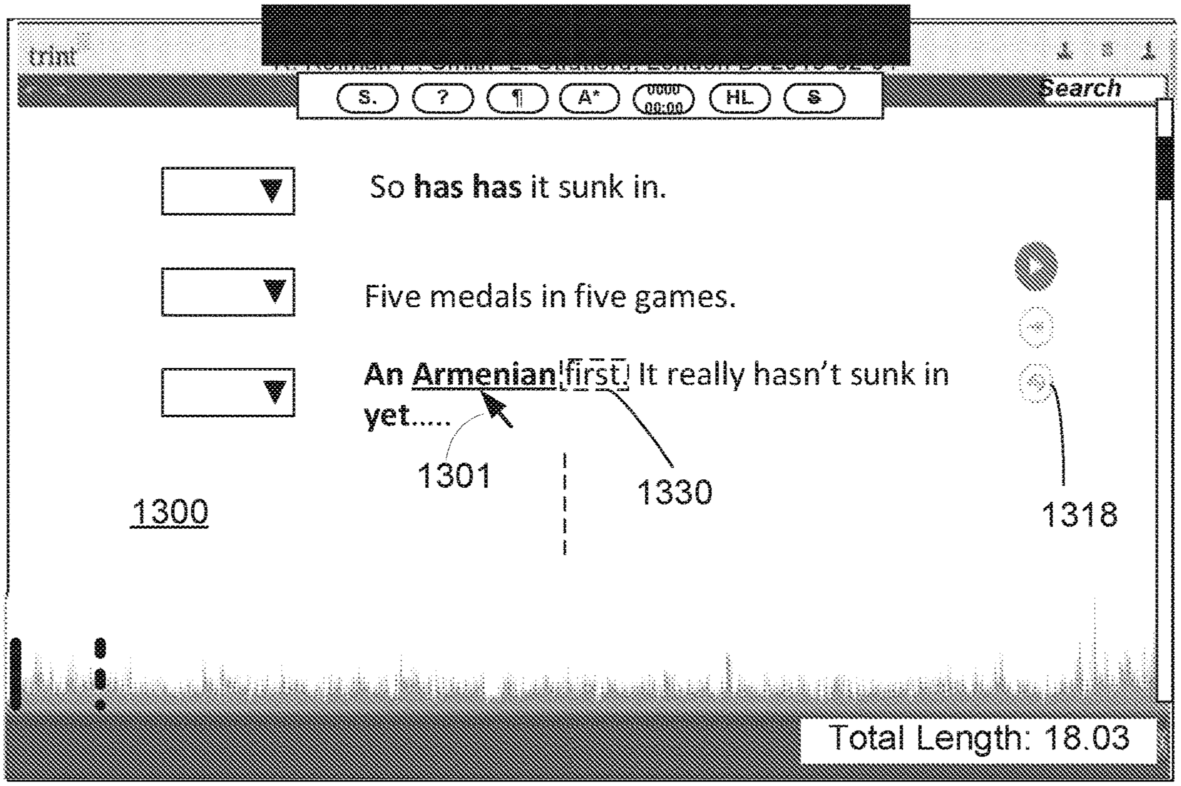
Figure 16:
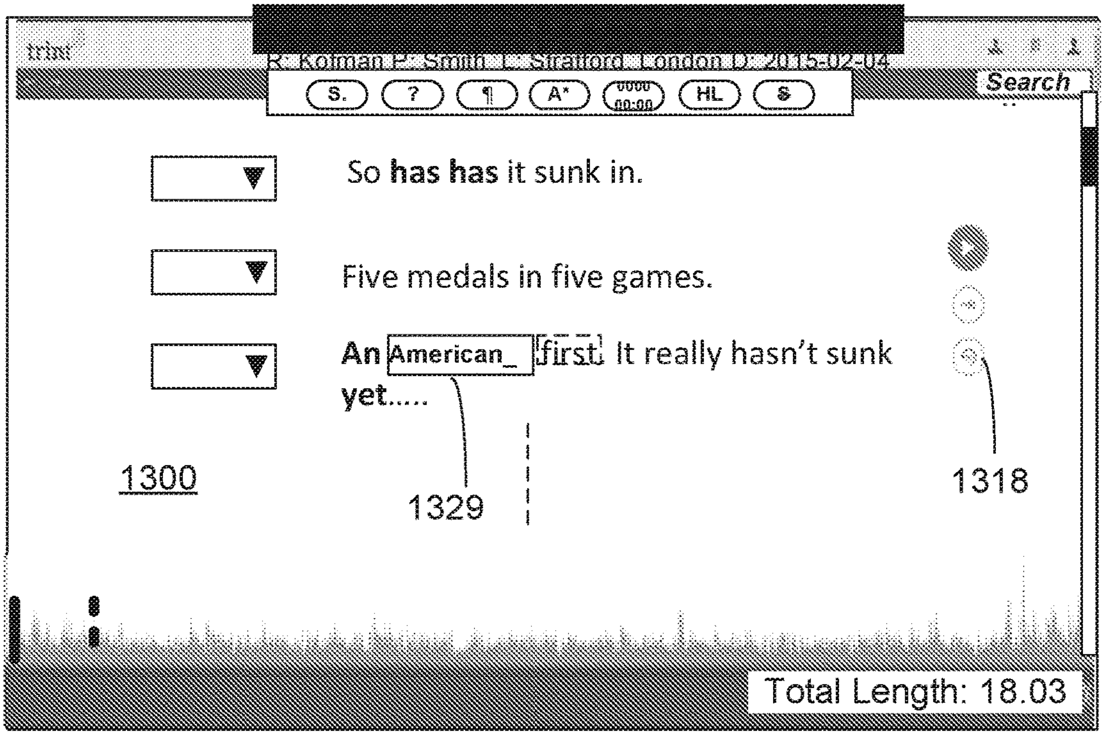
Figures 17, 18:
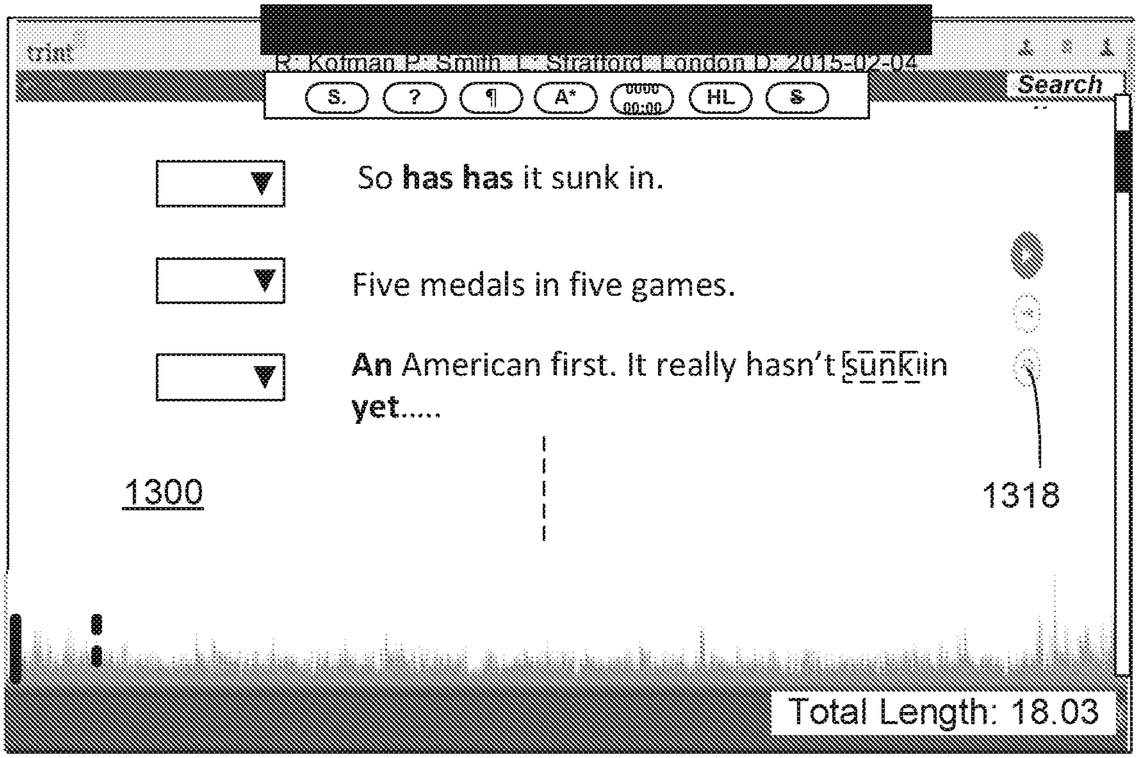

Referring to FIGS. 15 through 18, an example of a word edit sequence will now be described. In the illustrated example, during audio playback of "An Armenian first", the user determines that "Armenian" is in fact a mis-transcription of "American". In FIG. 15, when the user places navigation pointer 1301 on the word "Armenian", user device 108 causes an underline or other focus indicator to appear under the word so that the user can see the word is being focused. Double clicking on the focused word then causes the word to be placed in an edit box 1329 as shown in FIG. 16, in which a user can use standard edit keys and text keys to correct the word to "American" as shown. Once the user has made the correction, the user can save the change and exit the edit box 1329 by performing one or more predetermined user actions, including for example pressing an enter key or tab key, or using quick edit button 1318 to advance to the next low confidence word, or using navigation pointer 1301 to select another word to start playback on. In an example embodiment, when the user presses the "enter" or "tab" key after making the correction, the change is saved, edit box is closed, the corrected word is displayed inline and audio playback commences at the corrected word and continues. In this regard, FIG. 17 illustrates user interface 1300 after user correction of the word "Armenian" to "American". As can be seen in FIG. 17, correction of the word automatically causes its associated confidence level to be set at 100%, and accordingly "American" is no longer displayed with a low confidence indicator (e.g. it is no longer shown in bold lettering, but is just in normal typeface).

The user device 108 and media editing system are configured to provide any change information back to the media editing system 102 so that the corresponding edit data 228 stored at media editing system 102 can be updated accordingly. In some example embodiments, groups of changes are periodically sent as a change stack to media editing system 102 for edit updating purposes. In the present example, the edit change results in updates to selected attribute:value pairings in the "Armenian" word object 705-13 of edit data 228. In particular, the pairing "name":"Armenian" is changed to "name":"American" and the pairing "confidence":0.598 is changed to "confidence":1. The updated word object 705-13 as saved by media editing system 102 is shown in FIG. 18 with the changes shown in bold for purposes of illustration.

Figure 19:
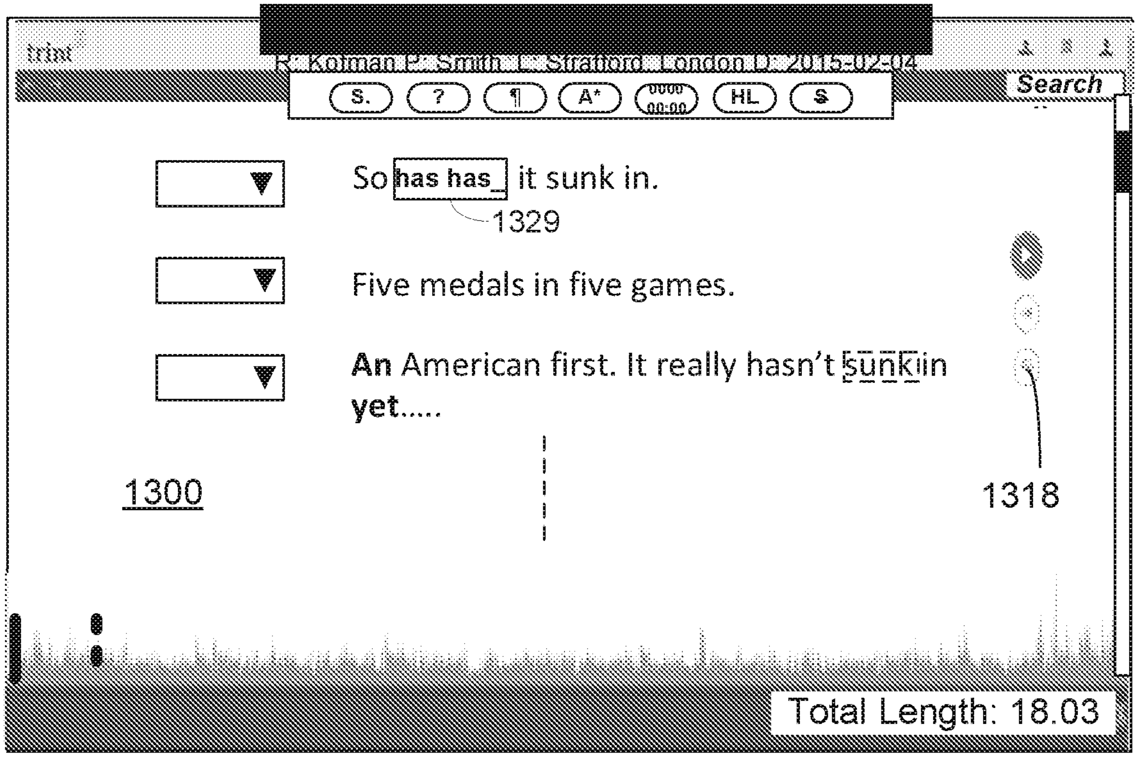
Figure 20:
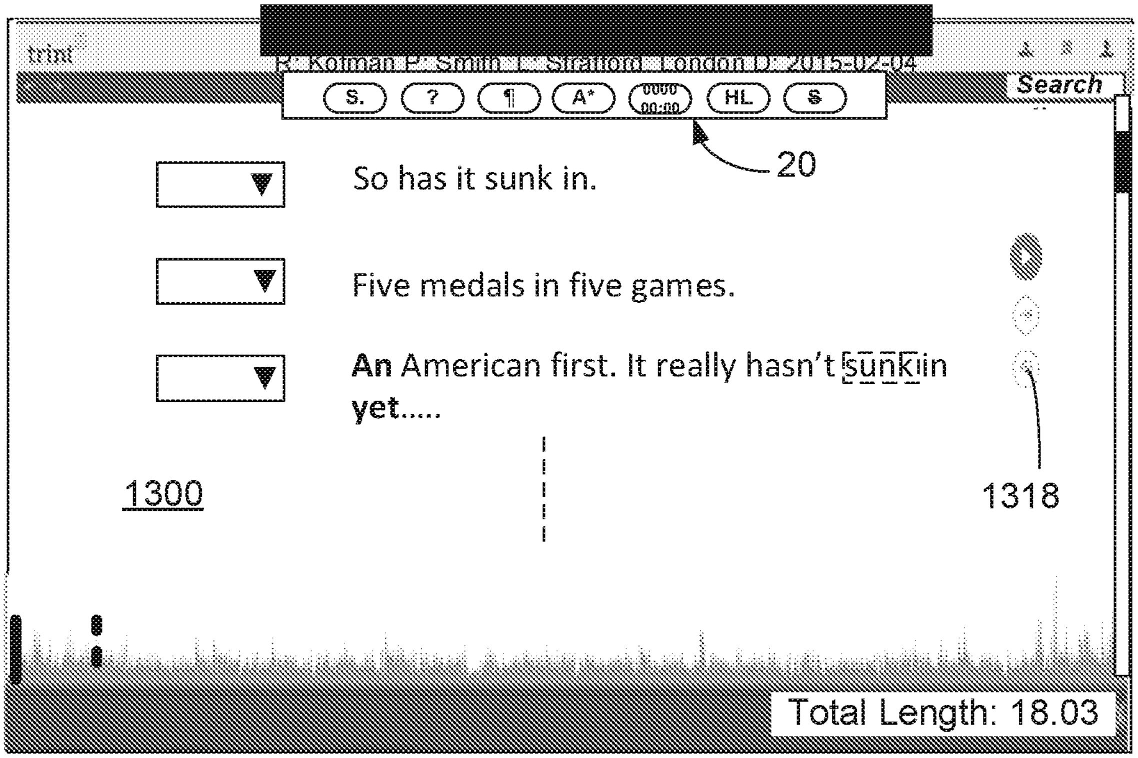

In addition word level editing, edit box 1329 can also be used to edit text blocks of multiple words. In an example embodiment, a block of text can be selected by a predetermined user input, for example, in response to a user focusing a word with navigation pointer 1301, performing a single click and immediately dragging the navigation pointer over additional words to highlight a block, following which a double click will place the selected text in an edit block 1329. In this regard, FIG. 19 shows and example in which the adjacent words "has has" have been selected as a text block for editing and appear in text edit box 1329; for example, during audio playback the user has determined that in fact the word "has" was only haltingly spoken once and misinterpreted as a the same word twice, and according, the user decides to replace the double occurrence with a single occurrence of "has". FIG. 20 shows the user interface 1300 post edit, and FIG. 21 illustrates the corresponding original word objects 705-2 and 705-3 and the resulting updated word object 705-2A. As can be seen, the deletion of the second "has" using edit box results in the two word objects 705-2 and 703-3 being replaced with a single word object 705-2A in the edit data 228 stored at media editing system 102. In view of the deletion of an object, editor module 212 is configured to recalculate the "duration" resulting from the edit, which in the illustrated embodiment involves adding the durations of the two original objects together to arrive at a new duration of 560 ms. The confidence attribute is also updated to 1 in updated object 705-2A and the displayed word "has" is shown without a low-confidence indicator in UI 1300.

The above edit example illustrates an example of multiple word objects being combined into a single object. In some examples, the system also supports the use of edit box 1329 to take one or more word objects and convert it or them into a higher number of word objects. In this regard, FIGS. 22 and 22A provide an example in which the word object 23 associated with the word "You" in a transcribed sentence is replaced with three word objects 23A, 23B and 23C. FIG. 22 illustrates successive views 22A, 22B and 22C presented on UI screen 1300 of the sentence containing "You create fake crowds." The first view 22A shows the sentence as originally presented. Upon synchronized audio playback with movement of audio indicator 1330, the user realizes that the speaker in fact said "So do you . . . " rather than just the single word "You", and according selects "You" for editing within edit box 1329 (view 22B), and replaces "You" with "So do you" (view 22C), resulting in the post edited sentence "So do you create fake crowds." (view 22D). Word object 23 corresponds to the content of edit data 228 that is associated with "You" in view 22A, which is replaced post editing with three word objects 23A ("So"), 23B ("do"), and 23C ("you") which correspond to the view 22D.

As can be seen in FIG. 22A, in an example embodiment the media editing system 102 is configured to assign timing attributes to the replacement word objects 23A, 23B, 23C in order to maintain synchronized word level timing data. Although different timing algorithms can be used, in the illustrated embodiment the timing values are calculated on a pro-rata basis by splitting the original duration (140 ms) among the three replacement words passed on the number of letters in each of the replacement words, resulting in a duration attribute of 40 ms for two letter words "So" and "do" and 60 ms for three letter word "you". As can be seen in FIG. 22A, the "time attribute" for the first replacement object 23A is set to the original time attribute (258310 ms), with the first word duration specified in object 23A of 40 ms being added to set the time attribute (258350 ms) for second word object 23B and so on.

It will thus be appreciated that user device 108 and the editor module 212 of media generating system 102 are configured to collectively permit a user to perform corrections in which the number transcribed words is decreased or increased while still retaining word level timing that is synchronized with audio playback.

Referring again to UI 1300 as shown in FIG. 20, in example embodiments UI screen 1300 includes a toolbar 20 that includes a plurality of selectable items that support various UI and editing functions. As can be seen from the enlarged version of toolbar 20 shown in FIG. 23, in the illustrated embodiment the selectable tool items include: "S." 22; "?" 24; "¶" 26; "0000/00:00" 30; "HL" 32 and "~~S~~" 34, although the number and functionality of the selectable items can be different in other example embodiments.

The functionality of tool item "S." 22, which is a sentence format tool, will now be described with reference to FIGS. 24 and 25. FIG. 24 illustrates three subsequent representations of the text "Five medals in five games." by UI 1300. In the illustrated embodiment, the user determines, based on audio playback, that the speaker appear to have spoken the phrase "Five medals in five games" as two sentences. The user performs a predetermined action to highlight 2402 the words of the first sentence, namely "Five medals" (for example using a combination of navigation marker 1301 movements and single clicking), as shown in the second line of FIG. 24. User selection of the tool item "S." 22 (for example through a double click of the "S." item) causes the words in highlight box 2402 to be automatically re-presented in interface 1300 as an independent sentence and the first letter of the immediately following word to be capitalized to indicate the start of a new sentence, as shown in the third line of FIG. 24. Making the words in the highlight box 2402 into a sentence includes capitalizing the first letter of the first word (if it is not already a capital) and adding a period after the last word in the highlight box 2402. FIG. 25 illustrates the word objects 705-8 and 705-9 in edit data 228 for the words "medals" and "in" both before and after the "S." sentence format tool 22 is used. As can be seen in the lower "after" version, the word "medals" has been replaced with "medals." (e.g. a period added) in object 705-8, and the word "in" has been replaced with "In" (e.g. capitalized) in object 705-9.

Accordingly, in at least some applications the "S." sentence tool 22 provides a convenient means by which transcribed text can be quickly placed into correct sentence structure by a reviewer.

The functionality of tool item "?" 24, which is a question format tool, will now be described with reference to FIGS. 26 and 27. FIG. 26 illustrates three subsequent representations of the text "So has it sunk in" by UI 1300. In the illustrated embodiment the user determines, based on audio playback and/or the illustrated text that the phrase "So has it sunk in" is a question. The user performs a predetermined action to highlight the words of the question in highlight box 2402 (for example using a combination of navigation marker 1301 movements and single clicking), as shown in the second line of FIG. 26. User selection of the tool item "?" 24 (for example through a double click of the "?" item) causes the words in highlight box 2402 to be automatically re-presented in interface 1300 as a question as shown in the third line of FIG. 26, which involves: (1) capitalizing the first word in the phrase if it is not already; and (2) adding a question mark to the final word in the phrase and deleting any other punctuation that may be present after the final word such as a period.

FIG. 27 illustrates the word object 705-6 in edit data 228 for the word "in" both before and after the "?" sentence format tool 24 is applied. As can be seen by comparing the upper "before" and the lower "after" versions, the sentence punctuated word "in." has been replaced with question-mark punctuated word "in ?".

Accordingly, in at least some applications the "?" question tool 24 provides a convenient means by which transcribed text can be quickly edited by a reviewer to correctly identify questions.

The functionality of tool item "¶" 26, which is a paragraph formatting tool, will now be described with reference to FIGS. 28 and 29. As noted above, in example embodiments, each paragraph of text displayed in UI 1300 is associated with its own speaker ID box 1312 that can be used to provide an identity of the speaker of the paragraph. FIG. 28 illustrates three subsequent representations of the text "An American first. It really hasn't sunk in yet . . . " by UI 1300. In the illustrated embodiment the user determines, based on audio playback that the phrases "An American first." and "It really hasn't sunk in yet . . . " are actually spoken by different people and accordingly should be in different paragraphs each having its respective speaker ID box. The user performs a predetermined action to highlight the words that should be put into an independent paragraph with highlight box 2402 as shown in the second line of FIG. 28. User selection of the tool item "¶" 26 (for example through a double click of the "¶" item) causes the words in highlight box 2402 ("An American First.") and the remaining words in the original paragraph ("It really hasn't sunk in yet . . . ") to be automatically re-formatted and presented in interface 1300 as two separate paragraphs, each having its own associated speaker ID box 1312A, 1312B as shown in the third line of FIG. 28.

As noted above, word objects 705 in edit data 228 each have a paragraph:value attribute pairing, which is updated by media editing system 102 to track changes in paragraph numbering. In this regard, FIG. 29 illustrates the word objects 705-14 and 705-15 in edit data 228 for the words "first." and "It", respectively, both before and after the "¶" sentence format tool 26 is applied. As can be seen by comparing the "before" and "after" versions, the paragraph attribute for the word "It" has been incremented from "para":"p2" to "para": "p3" to track that "An American first." is in a separate paragraph then "It really hasn't sunk it yet . . . ". The media editing system 102 similarly updates all subsequent para attributes throughput the edit data 228 to accommodate the insertion of an additional paragraph. The speaker attribute is also updated in some embodiments as shown in FIG. 29.

Accordingly, in at least some applications the "¶" paragraph format tool 26 provides a convenient means by which a block of transcribed text can quickly be broken into paragraphs to account for speaker transitions that were not detected by S2T system 104.

Figure 30:
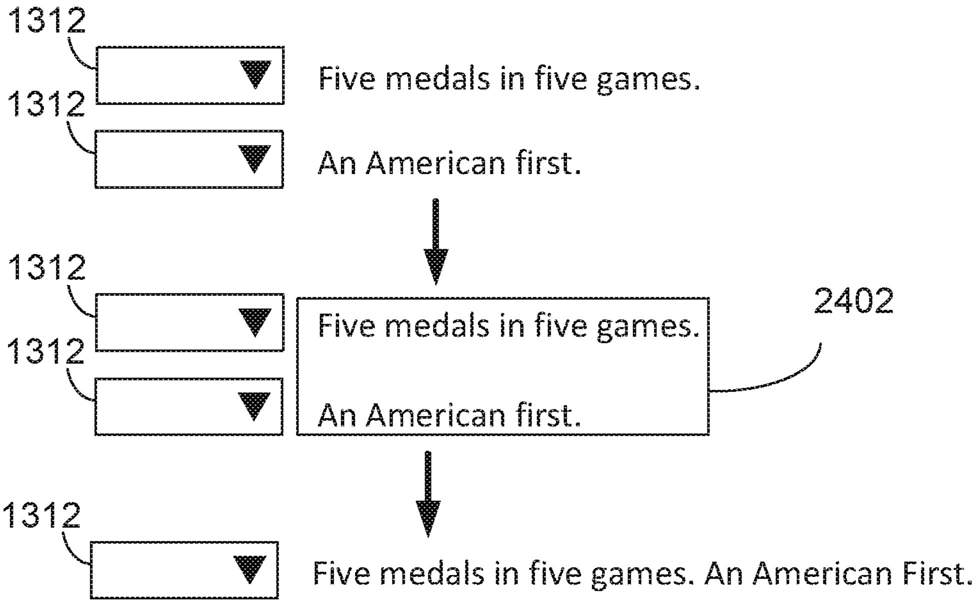

In addition to separating a block of text into separate paragraphs, the "¶" paragraph tool 26 can also be used in some embodiments to merge separate paragraphs into a single paragraph. In this regard, FIG. 30 illustrates an example in which two separate paragraphs are merged into single paragraph. In particular, FIG. 30 illustrates three subsequent representations of the text "Five medals in five games." "An American first." by UI 1300. In the upper representation of FIG. 30, the phrases "Five medals in five games" and "An American first" are each represented as separate paragraphs having their own Speaker ID box 1312 based on a false determination S2T system 104 that the phrases were spoken by different speakers. The user/reviewer determines, based on audio playback, that two phrases are actually spoken by the same person and accordingly can be merged into one paragraph having one speaker ID box. The user performs a predetermined action to highlight the block of words that should be put into a common paragraph with highlight box 2402 as shown in the middle of FIG. 30. User selection of the tool item "¶" 26 (for example through a double click of the "¶" item) causes the words in highlight box 2402 ("Five medals in five games") and ("An American First.") to be automatically re-formatted and presented in interface 1300 as a single paragraph, having one associated speaker ID box 1312 as shown in the bottom portion of FIG. 30.

The corresponding edit data 228 is also updated by media editing system 102. In particular, the "speaker":value and "para":value attribute value pairings for the word objects associated with each of the words "An American First." are updated from "speaker":"M1" to "speaker":"M2" and from "para":"p2" to "para":"p1" to correspond with the "speaker and "para" pairings associated with the words "Five medals in five games". Additionally, the "para" attribute values for paragraphs in edit data 228 may be updated to reflect the removal of a paragraph from the transcribed data.

Accordingly, in at least some applications the "¶" paragraph format tool 26 provides a convenient means by which a block of transcribed text that is broken into separate paragraphs can be combined to correct false speaker transitions detected by S2T system 104.

Figure 31:
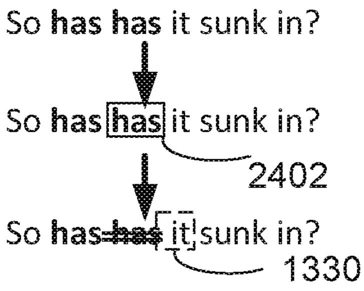
Figure 32:
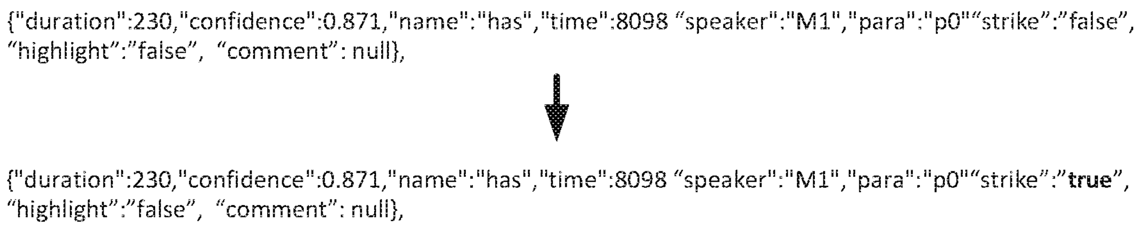

The functionality of tool item "S̶ " 34, which is a strike-out tool, will now be described with reference to FIGS. 31 and 32. FIG. 31 illustrates three subsequent representations of the text "So has has it sunk in" by UI 1300. An example was provided above in which the second occurrence of "has" was physically deleted. However, in the present example the reviewer determines, based on audio playback the "has" was actually verbally repeated, but wants to strike-out the second "has" as redundant while at the same time preserving the integrity of the transcript and the correct audio timing. Accordingly, the user performs a predetermined action to highlight the text that is to be struck out (which is "has" in the present example but could be multiple words in some examples) in highlight box 2402 (for example using a combination of navigation marker 1301 movements and single clicking), as shown in the second line of FIG. 31. User selection of the tool item "S̶ " 34 (for example through a double click of the "?" item) causes the word(s) in highlight box 2402 to be automatically re-presented in interface 1300 as struck-out as shown in the third line of FIG. 31. FIG. 32 illustrates the word object in edit data 228 for the struck out word "has" both before and after the "S̶ " strikeout tool 34 is applied. As can be seen by comparing the upper "before" and the lower "after" versions, the "strike" attribute has been changed from "false" to "true".

In example embodiments, during audio playback the user device 108 is configured by instructions received from media editing system 102 to skip over the audio associated with any words that have an associated "strike":"true" attribute value pairing. For example, during audio play back, the audio commencing at time 8098 ms will be skipped for a duration of 0.230 seconds. Similarly, at the same time, audio indicator 1330 will skip the struckout word "has".

Figure 33:
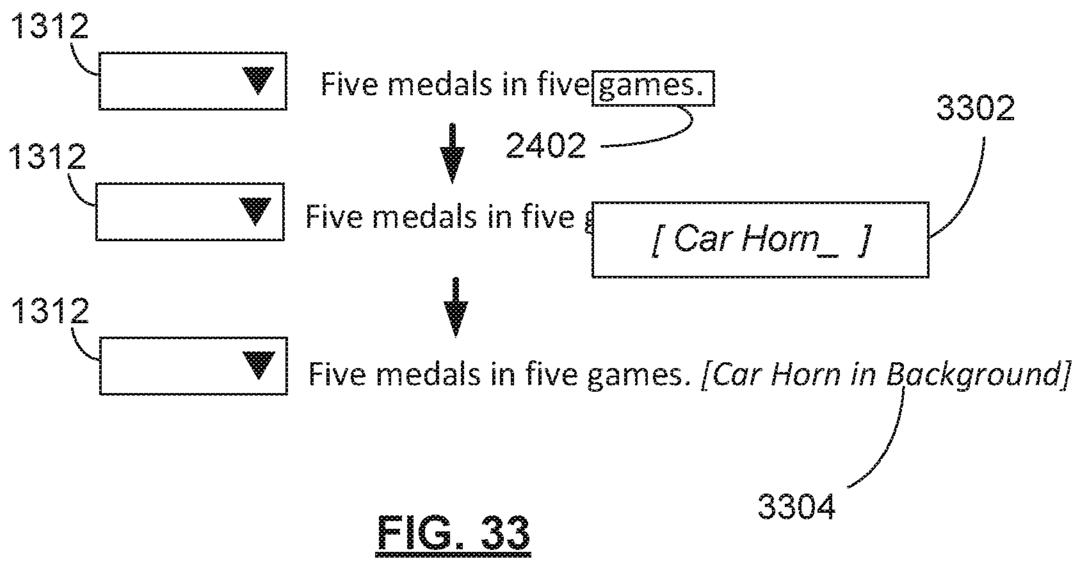

The functionality of tool item "A*" 28, which is a comment tool, will now be described with reference to FIG. 33. FIG. 33 illustrates three subsequent representations of the text "Five medals in five games" by UI 1300. In the first representation, the word "games." is presented in a highlight box 2402 in response to a predetermined user action. User selection of the tool item "A*" 28 (for example through a double click) causes an text edit box 3302 to appear on UI 1300 at or near the previously highlighted word, allowing the user to add a text comment, as shown in the second representation in FIG. 33. Once the user is done entering the comment, a predetermined user action (for example pressing "enter") causes user entered text to appear as an comment 3304 adjacent the originally highlighted word. In the illustrated example, the comment 3304 "[Car Horn In Background]" appears in-line with the text, after the word "games" in the tghord representation in FIG. 33. The comment is marked to distinguish it from the transcript text—in the illustrated example, square brackets and italics are used to distinguish the comment. Furthermore, the annotated text is skipped by audio indicator 1330 during audio playback. As noted above each word object 705 includes a "comment-":"string" value pairing; when an comment is added to a word using the "A*" comment tool 28 the pairing is updated in edit data 228 by media editing system 102. In the illustrated example the pairing for the word object associated with "games" is changed from "comment":null to "comment":"Car Horn In Background".

Comment tool "A*" 28 provides a convenient mechanism by which a transcript reviewer can add background notes to transcribed text in a manner that does not interfere with audio playback timing and allows the comment to be easily visually distinguished from the transcript text.

Figure 34:
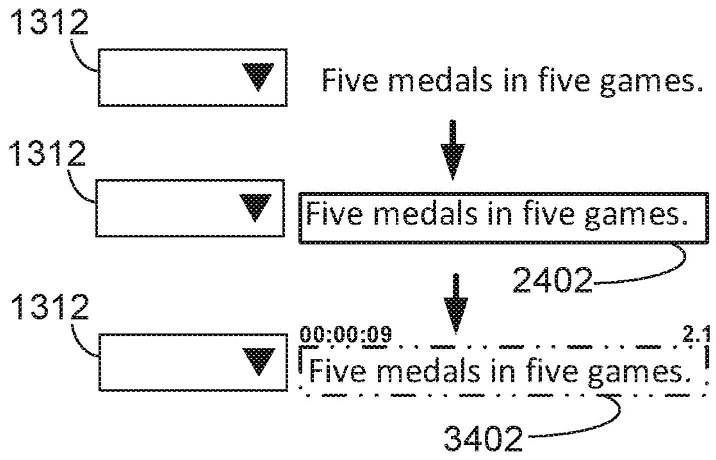
Figure 34A:
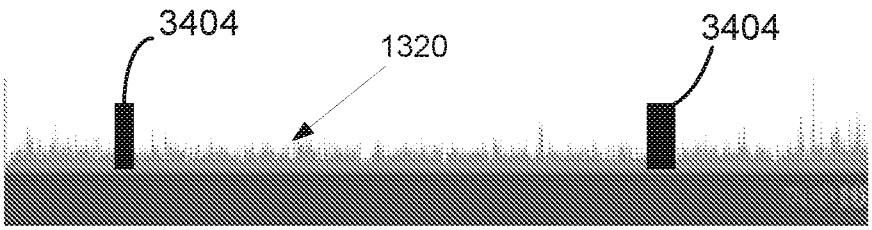

The functionality of tool item "HL" 32, which is a persistent highlight tool, will now be described with reference to FIG. 34. FIG. 34 illustrates three subsequent representations of the phrase "Five medals in five games." by UI 1300. In the first representation, the phrase is presented as originally transcribed. In the second representation the phrase is presented in a highlight box 2402 in response to a predetermined user action. User selection of the tool item "HL" 32 (for example through a double click) causes the text in the highlight box to be permanently highlighted in the transcript with a persistent highlight marker 3402, as shown in the third representation in FIG. 34. Additionally, a "start time" is presented on UI 1300 in association with the highlighted text as well as a "duration", enabling a user to easily determine at what point in time the selected phrase appears in the transcript and the duration of the phrase. In the illustrated example of FIG. 34, the start time of 00:00:09 is displayed (which is the time:value attribute for the first word in the highlighted phrase) and the duration is 2.1 s, which is the sum of all the durations of all of the words in the highlighted phrase. As noted above each word object 705 includes a "highlight":true/false value pairing; when a string of words are highlighted using persistent highlight tool "HL" 32, the pairing is updated to "highlight":"true" for each of the words in the string and the word objects updated in edit data 228 by media editing system 102 so that the next time the transcript is retrieved the persistent highlight information is again presented in the interface 1300. As noted above, in example embodiments an audio waveform 1320 representing the entire transcription is presented on UI 1300. As represented in FIG. 34A, in some example embodiments user device 108 is configured to overlay highlight indicators 3404 on the audio waveform 1320 that correlate to the relative location and length of sections of the transcript that are highlighted with highlight markers 3402. Accordingly, highlight indicators 3404 provide a visual indication to a user/reviewer of where highlighted portions of the transcript are even when those exact portions are not immediately displayed in the viewable region of UI 1300. In some example embodiments a user can jump to a highlighted region (e.g. cause that region to be displayed in the viable region of UI 1300) by clicking or otherwise selecting the corresponding highlight indicator 3404.

Persistent highlight tool "HL" 32 provides a convenient mechanism by which a transcript reviewer can quickly highlight a phrase of interest for future reference and be provided with timing information for the phrase.

Figure 35:
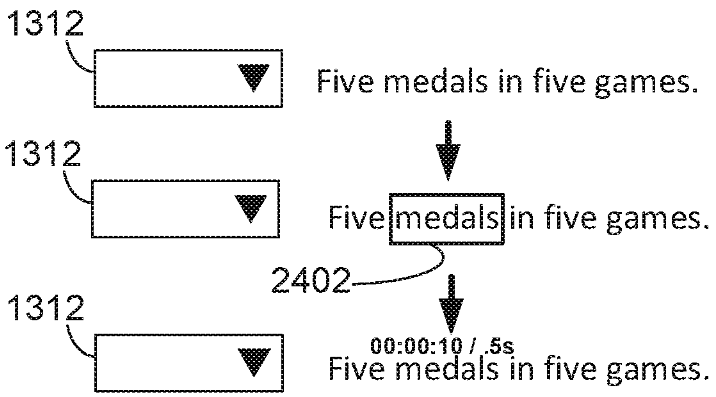

The functionality of tool item "0000/00:00" 30, which is a visual word timestamp tool, will now be described with reference to FIG. 35. FIG. 35 illustrates three subsequent representations of the phrase "Five medals in five games." by UI 1300. In the first representation, the phrase is presented as originally transcribed. In the second representation the phrase is presented with the word "medals" in a highlight box 2402 in response to a predetermined user action. User selection of the tool item "0000/00:00" 30 (for example through a double click) then causes the word in the highlight box 2402 to be time stamped as shown in the third representation in FIG. 35. The time stamp can take a number of different forms—in the illustrated example the word start time (00:00:10) and duration (0.5 s) as identified in the word object 705 for "medals" are displayed adjacent or in-line with the word "medals. In one example embodiment, the fact that a word has been "time stamped" is recorded by including a "timestamp":"true" attribute/value pairing in the corresponding word object that is stored by the media editing system 102. In another example embodiment, a specified string is used in "comment":"string" pairing to mark a word as time-stamped. Alternative selection methods can be used for sleeting a word to time-stamp; for example, during audio playback, selecting the tool item "0000/00:00" 30 may cause the word currently focused by the audio start indicator 1328 to be visually time stamped. Visual timestamp tool "0000/00:00" 30 may in at least some examples provides a convenient mechanism by which a transcript reviewer can quickly determine and visually record a particular word timing for present and future reference.

Figure 36:
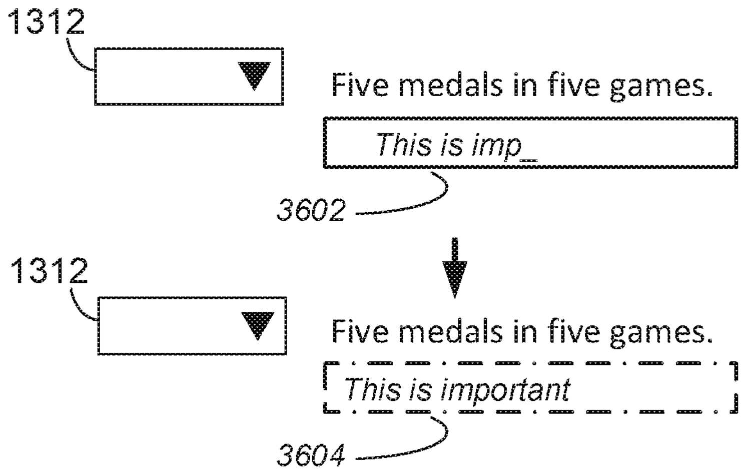

In addition to, or as an alternative to, the in-line comments discussed above, in at least some example embodiments, the system is configured to allow comments to be inserted after paragraphs. In this regard, FIG. 36 illustrates two subsequent representations of the phrase "Five medals in five games." by UI 1300. Referring to the first representation, upon detecting a predetermined user action, the user device 108 is configured to display a comment addition box 3602 and position a text input cursor in the box. In the illustrated embodiment, the predetermined user action may for example be the positioning of a navigation pointer in the region of the screen immediately under the paragraph for a predetermined duration, or may be a screen touch in the same region. Once the comment input box 3602 is presented, the user/reviewer can enter and save a desired paragraph comment, which will subsequently be presented in association with the paragraph in a comment format 3604 that visually distinguishes the comment content from the transcribed text, as shown in the second representation of FIG. 36. The comment text is not played as part of audio playback of the transcribed text. In one example embodiment, the fact that a paragraph has been associated with a paragraph comment is recorded by including a "paracomment":"string" attribute/value pairing in the corresponding word object for the final word in the paragraph such that the comment can be stored by the media editing system 102 and reproduced in subsequent transcript views. In the illustrated embodiment, the attribute:value pairing "paracomment": "This is important" is included in the object for the word "games."

As can be seen in FIG. 13, in some example embodiments the user interface 1300 includes a search field 1340 which can be used to quickly find specified text in the viewed transcript. Additionally, the user interface 1300 includes "undo" and "redo" buttons 1342, 1344 that allows recent changes to be undone and redone.

As noted above, the transcript paragraphs displayed in UI 1300 are each associated with a speaker transition and speaker ID boxes 1312 are provided next to each of the transcript paragraphs to identify the speaker. In at least some example embodiments, speaker ID boxes are automatically populated based on the value assigned to the "speaker" attribute for each of the word objects 705 associated with the content of a paragraph. For example, in FIG. 13, based on the word object attributes listed in FIG. 7, the speaker box 1312 associated with "So has has it sunk in." would be populated with "M1" (i.e. "male speaker number 1"), the speaker box 1312 associated with "Five medals in five games." would be populated with "M2" (i.e. male speaker 2), and the speaker box 1312 "An Armenian first. It really hasn't sunk in yet" would be populated with "M1". As will be appreciated form FIG. 7, each of the speaker values are assigned a text string in "speakers" object 704, which can be used to automatically populate the speaker ID boxes—for example, in speaker object 704, the speaker "M1" can be designated as {"M1":{"name":"Jeff K."} . . . }.

Figure 37:
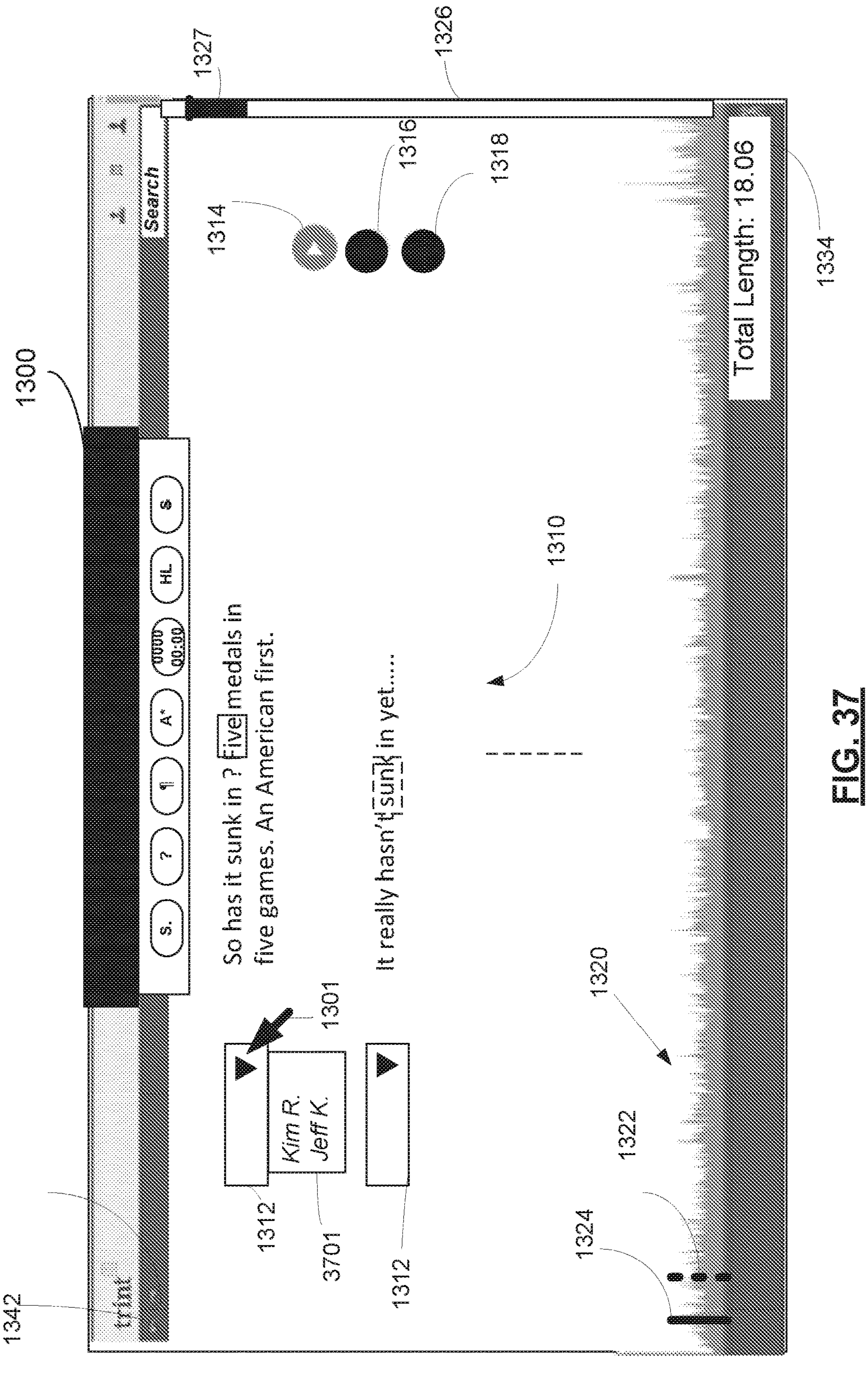

In the illustrated example embodiment of FIG. 13, the speaker ID boxes are not automatically populated, but are rather populated through user interaction with a drop down menu function. In this regard, FIG. 37 represents UI 1300 once a reviewer has, with the aid of audio playback, used the edit and paragraph formatting tools described above to correct transcription errors in the text shown in FIG. 13 and reformat the text into two paragraphs, each of which is associated with a different speaker. In the example of FIG. 37, user device 108 has detected that a navigation tool such as pointer 1301 has been used to focus the speaker box 1312 that is associated with the paragraph "So has it sunk in? Five medals in five games. An American first.". In response, user device 108 causes a drop down list 3701 of user selectable speaker names to appear.

Figure 38:
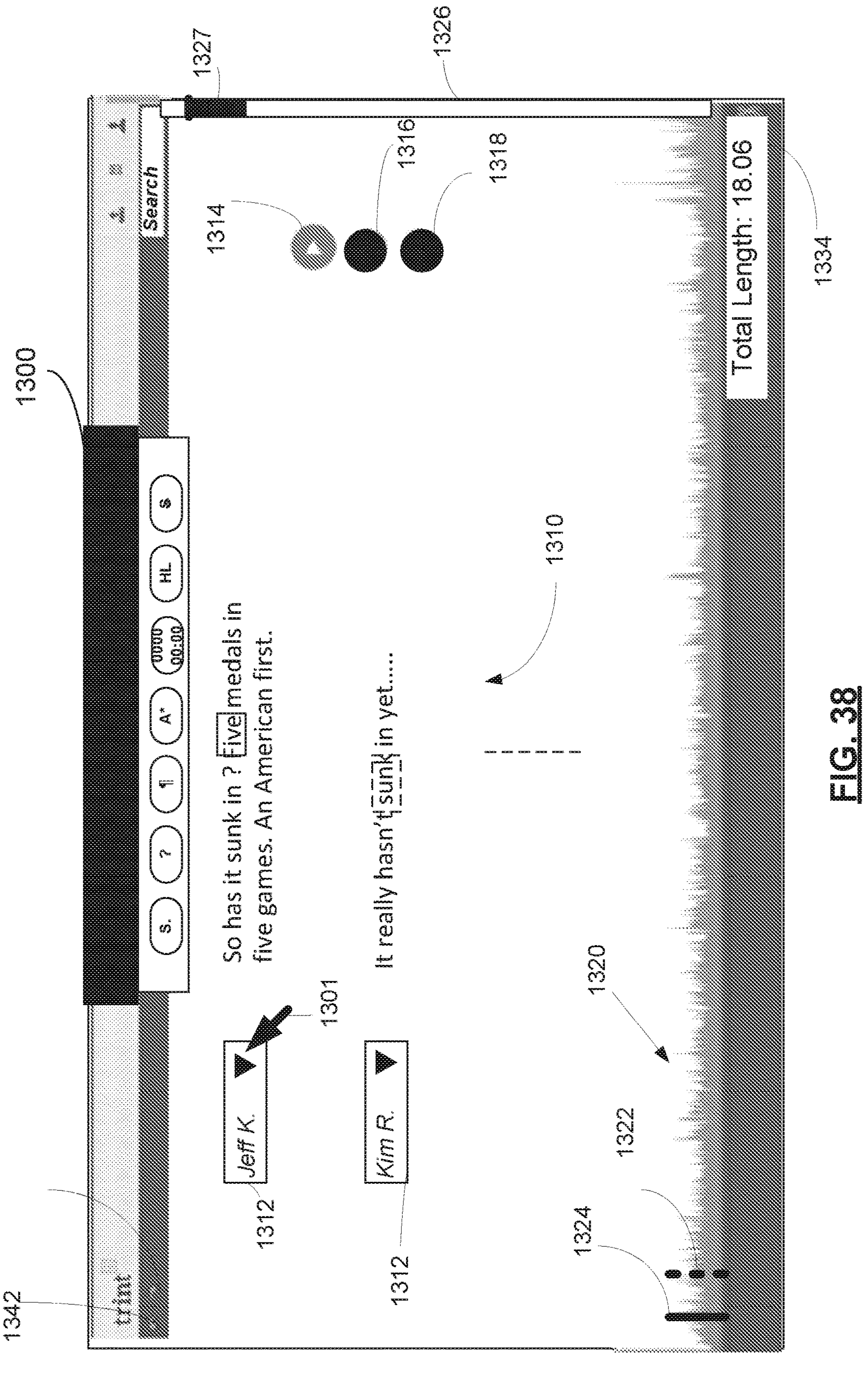

In at least some example embodiments, the list 3701 is pre-populated based on metadata 229. As noted above in respect of FIG. 12 speaker metadata can be input through UI screen 1202 in at least some embodiments. Accordingly, in the illustrated example, the speaker name list 3701 includes "Kim R." and "Jeff K.", which have been previously entered through UI 1202. User selection of one of these names (for example through navigation pointer 1301) will result in the selected speaker name being associated with the speaker ID for a paragraph. In this regard, FIG. 38 displays UI 1300 in which the speaker ID boxes 1312 for the first and second paragraphs have been populated with "Jeff K." and "Kim R." respectively. In an example embodiment, the "speaker" object 704 of edit data 228 (FIG. 7) is updated to correspond to the changes made in UI 1300. For example, in the illustrated example, the speakers "M1" and "M2" in object 704 will be designated {"M1":{"name":"Jeff K."} . . . "M2":{"Kim R."}.

In some example embodiments where speaker ID boxes are not automatically populated, a flag may be included in the word objects 705 associated with a paragraph word to indicate that the speaker ID box 1312 associated with the paragraph has been populated. For example, the word objects for the words in a paragraph that has a populated speaker ID box could include the attribute:value pairing "ID":true, and the words in a paragraph having a non-populated speaker ID box would include the attribute:value pairing "ID":false. In other example embodiments, information is included in metadata 229 that identifies which speaker ID boxes are populated or not.

Accordingly, in example embodiments, speaker ID boxes 1312 provide a convenient mechanism by which a reviewer can diarize transcript paragraphs by speaker as the reviewer listens to the audio playback of the transcript.

Figure 39:
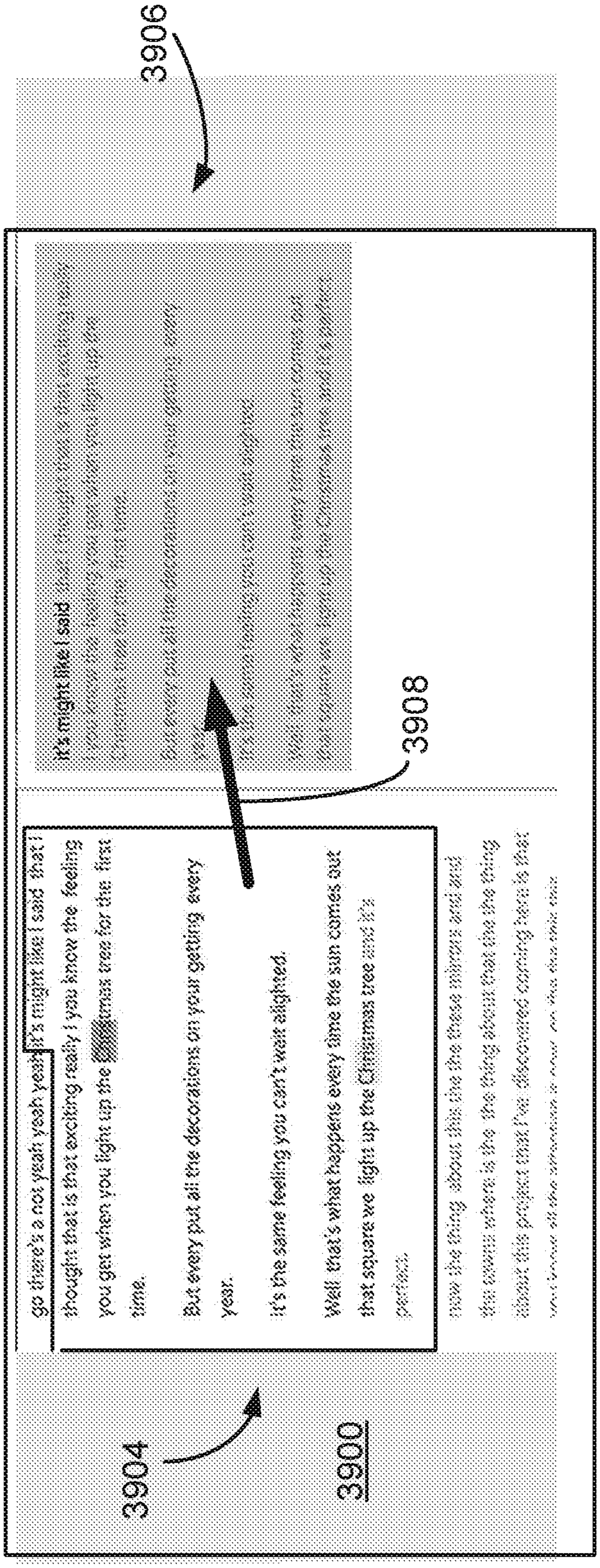

Another example embodiment of UI 3900 generated on user device 108 under instructions from the user device and media editing system 102 will now be described with reference to FIG. 39. UI 3900 includes a first UI element 3904 (shown on the left hand side of the UI screen) and a second UI element 3906 (shown on the right hand side of UI screen). In example embodiments, the first UI element 3904 provides word-aligned audio playback and editing functionality that is substantially identical to that described above in respect of UI 1300. The UI 3900 is configured to allow user selected parts of the transcript text from first UI element 3904 to be copied over to the second UI element 3906 as illustrated by arrow 3908. In one example embodiment, portions of the transcript text in first UI element 3904 can be highlighted in response to a detected user input activity, and then the highlighted portion copied, dragged and dropped into the second UI element 3906. Accordingly, UI 3900 allows a user/review to select and extract selected portions of the transcript text to create an extracted transcript. In example embodiments, word-aligned audio playback functionality is also provided for the second UI element 3906 such that the extracted transcript material can be audited and edited in a manner similar to that described above. When audio playback is initiated from the second UI element 3906, playback indicator is displayed on the text in the second UI element 3906 and audio is only played back for the extracted text portions that have been copied to the second UI element 3906.

In at least some example embodiments, at least some editing functions (for example paragraph and sentence editing, word editing and correction, speaker ID updates etc.) performed on one side of the UI 3900 are automatically applied to the corresponding text (if any) that exits in the other side of UI 3900—for example, edits performed on words in first UI element 3904 are also applied to the corresponding words that have been copied to the second UI element 3906. In some example embodiments, words in transcript data in first UI element 3904 that have been struck out are removed completely from the transcript text displayed in the second UI element 3906.

In example embodiments, the word objects and related data that correspond to the extracted transcript portions in UI element 3906 are stored as extracted data 230 by media editing system 102 (see FIG. 2). Extracted data 230 may for example be a JSON file that includes a subset of the word objects of the corresponding edit data 223 from which the extracted data has been derived. In at least some example embodiments, media editing system 102 is configured to also save an extracted audio component 222 that includes a sub-set of audio data from audio component 122 that corresponds to the extracted transcript data. Accordingly, in at least some example embodiments, the presently described system provides an environment in which an audio recording can be transcribed to text, then the audio and transcribed text reviewed in a audio/text word aligned interface, and selected text extracted with the corresponding audio through a drag and drop function to provide a subset of the audio data and corresponding transcript. In some example embodiments the extracted information can then be made available to the original reviewer or to third parties who then do not have to access the entire audio and transcript data.

Figure 40:
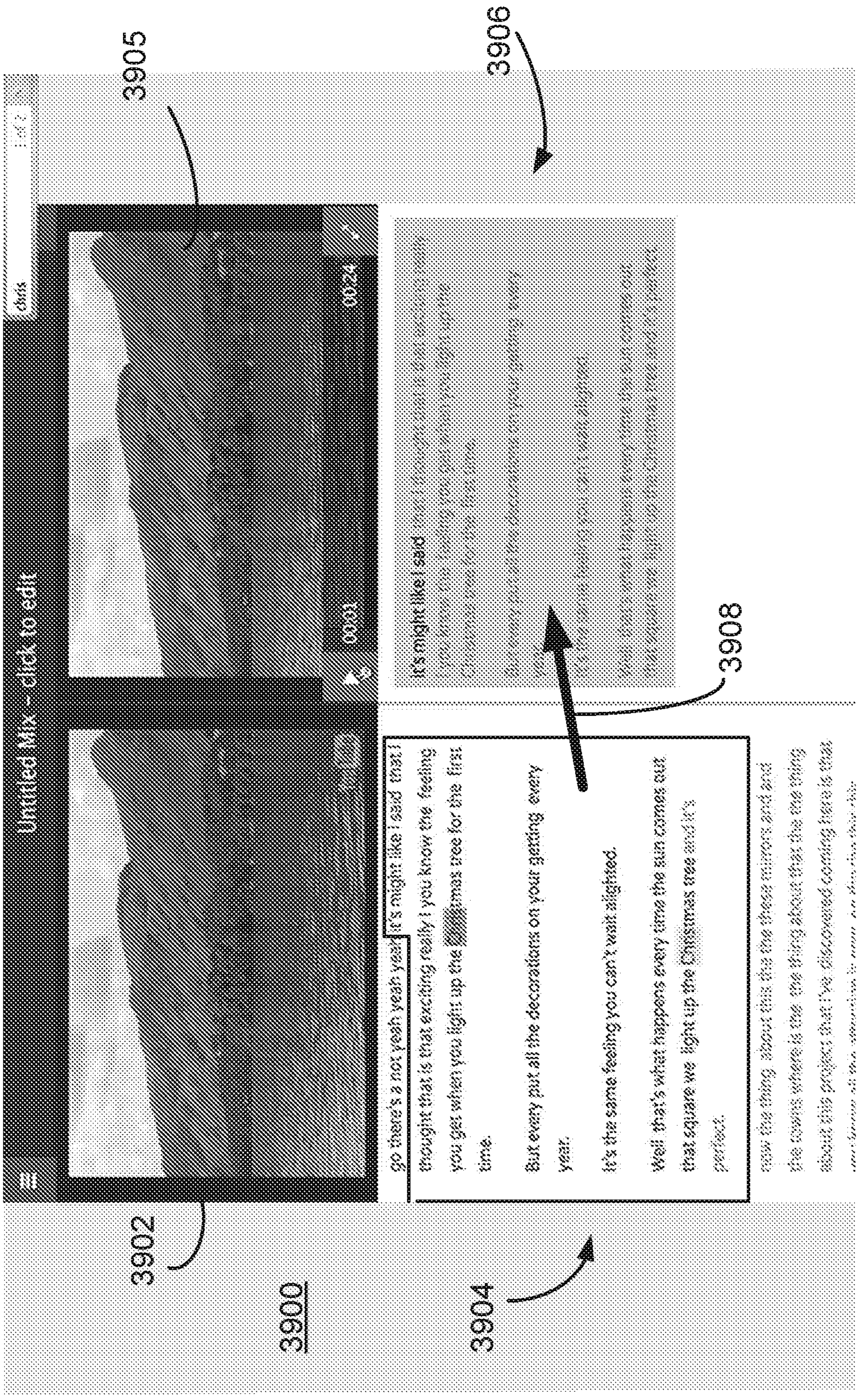

As noted above, in some applications the recorded data 120 also includes a video component 124. In some example embodiments, the media editing system 102 and user device 108 may be configured to also present the video in alignment with the text and audio that presented on device 108. In this regard, FIG. 40 shows a further example of UI 3900 that includes first and second video elements 3902 and 3905 that are configured to present the corresponding video information in alignment with audio playback and text display. In example embodiments, where selected transcript portions are copied from UI element 3904 to UI element 3906, the corresponding subset of video data 224 is included with the extracted audio data 222 as extracted A/V data 220.

In some examples, at least some of the functionality of media editing system 102 may be implemented at user device 108, particularly if user device 108 is configured with a resident transcript editor application 510.

In some example embodiments, media editing system 102 may be configured to maintain an augmented dictionary database that identifies words that enter the current news cycle but which might not otherwise be present in normal dictionary databases, such as place names and peoples names, for example. The database could be maintained for example by tracking corrected data received at media editing system 102 from user devices 108 and/or information scraped from on-line media sources. The augmented dictionary database could be provided to the S2T system 104 to provide improved transcription, and/or could be used to assist text correction at user devices 108.

In some example embodiments the persistent highlight tool "HL" 32 described above in respect of FIG. 34 or other discrete text selection mechanism can be used to create an extracted A/V multimedia file 220 that include transcribed text embedded or burned into the multimedia file 220 itself such that the file can be reviewed using a multimedia player with transcribed text appearing in the video component 224.

Figure 41:
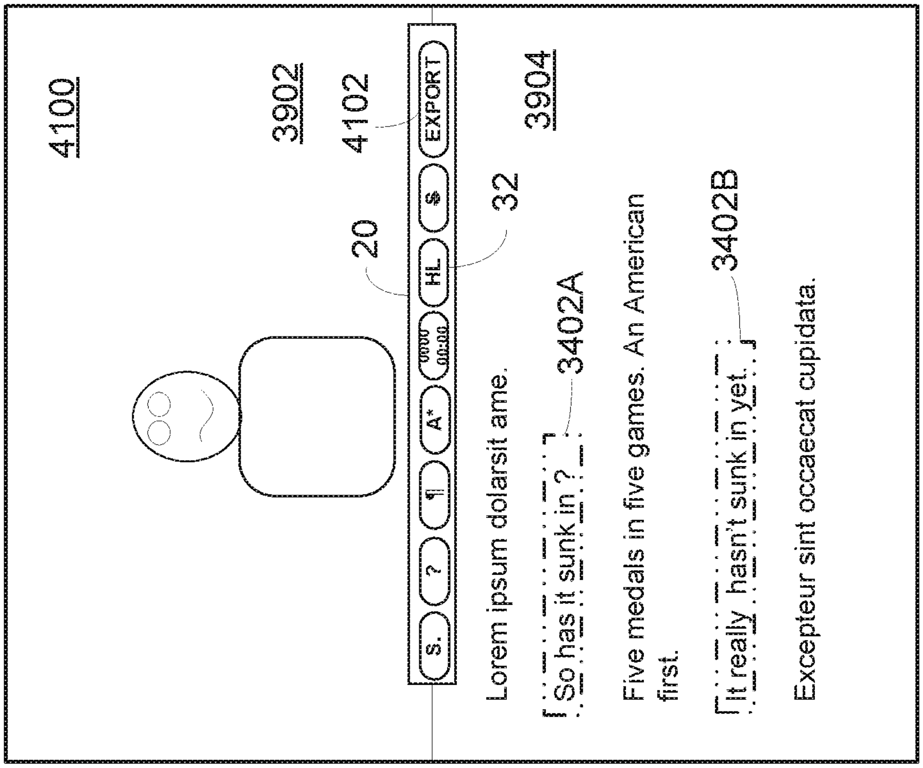

In this regard, FIG. 41 illustrates another example embodiment of a UI 4100 generated on user device 108 under instructions from the user device and media editing system 102. The UI 4100 is similar to the transcript editing interfaces described above and in this regard includes text display and editing UI element 3904 that allows word-aligned audio playback and editing functionality that is substantially identical to that described above in respect of UI 1300. However, similar to the interface of FIG. 40, UI 4100 also includes a video display element 3902 for displaying the contents of video data 124 in synchronization with the playback of audio data 122 and display of text transcript data 226. In the Example of FIG. 41, the transcribed text in edit data 228 file has been edited as described above in respect of FIG. 19 to remove a word in phrase "so has it sunk in ?" and adjust the corresponding word timing data in the edit data 228 file. Additionally, the user has used highlight "HL" tool 32 to highlight two phrases 3402A and 3402B within the transcribed text, namely "So had it sunk it?" and "It really hasn't sunk it yet". As described above, each word object 705 in edit data 228 includes a "highlight": true/false value pairing and when words are highlighted using persistent highlight tool "HL" 32, the pairing is updated to "highlight":"true" for each of the highlight words.

Figure 42:
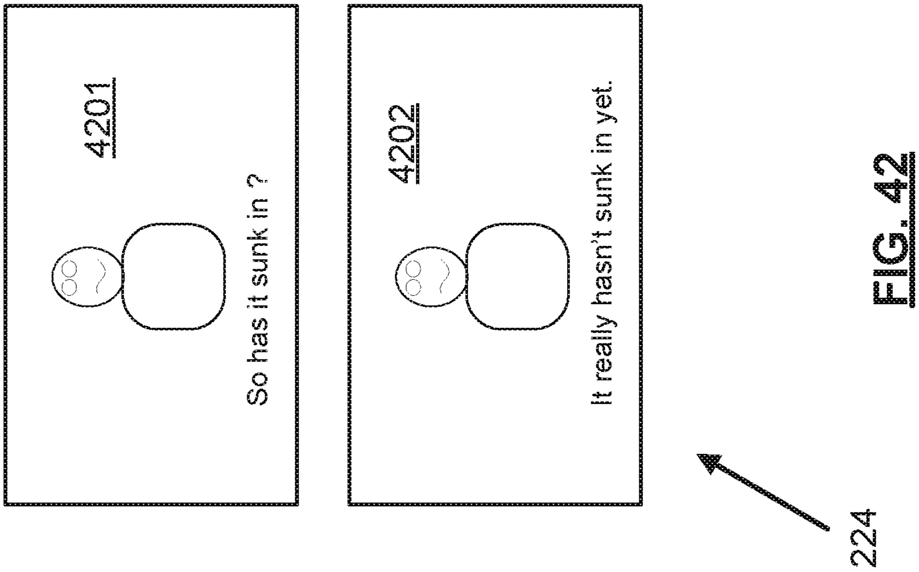

In the embodiment of FIG. 41, the tool bar 20 also includes a user selectable "Export" tool 4102 that causes the media editing system 102 to create, based on the timing information that is contained in the edit data 228 for the highlighted text portions 3402A and 3402B an extracted A/V file 220 that includes only the audio data and video data that is aligned with the highlighted text. Furthermore, in an example embodiment, media editing system 102 embeds or burns the highlighted text into the video component 224 of the extracted A/V file 220 that corresponds to the text, as represented by sub-titled video images 4201 and 4202 of FIG. 42.

Accordingly, in an example embodiment, user can edit transcribed words using the transcript editor function such that corrected words and timings are saved. A user can then highlight selected words or phrases using the transcription editor. When a user selects the "export" tool, an A/V clip that corresponds to the selected words or phrases is created. In particular, the media editing system 102 will calculate, based on the word object timing data in the transcript data edit file 228, the start and stop times of the highlighted portions and then extract the corresponding audio and video components from recorded data 120 and stitch the audio and video components together and burn the associated words onto the video component as video data.

Such a feature allows a user to quickly and efficiently create a highlight A/V clip that is accurately subtitled with little computer and processing time required. In some example embodiments, once an extracted A/V file 220 is created using the "export" tool 4102, the user is then presented with one or more "preview" or "share" options on interface 4100. A/V file could be any number of suitable formats, including for example a .mov, .avi, or .MP4 file. The preview option allows the user to view and hear the extracted A/V file 220. The share options could include, for example an "email" option that allowed either the A/V file 220 or a link to the file to be automatically attached to or embedded in an email message; a "Facebook™" option which allowed the A/V file 220 to be uploaded to the user's Facebook page; or other social media upload and sharing options such as Twitter™, Instagram™ etc.

The present disclosure provides certain example algorithms and calculations for implementing examples of the disclosed methods and systems. However, the present disclosure is not bound by any particular algorithm or calculation.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. A media generating and editing system comprising:
an interface system for receiving instructions and data;
electronic storage storing:
a media file that includes audio data;
an transcript data file that includes a plurality of text words transcribed from audio words included in the audio data, and timing data paired with the text words indicating locations in the audio data from which the text words are transcribed;

a processing system in communication with the interface and the electronic storage, wherein the interface system includes a network connection through which a user device communicates with the processing system, and configured by computer code to:

create the transcript data file by:

receiving the media file through the network connection;

transcode the received media file to a predetermined audio format optimized for a speech to text service prior to transmitting the media file to the speech to text service;

transmit the media file through the network connection to the speech to text service;

receive a raw transcript data file through the network connection from the speech to text service; and reformat the raw transcript data to a format optimized for the editing interface and save the reformatted raw transcript data file as the transcript data file;

the processing system further configured by computer code to:

enable audio playback of the audio data at a user device; and enable an editing interface that:

presents the text words on a display screen at the user device;

provides a visual marker that indicates the text words on the display screen in time alignment with the audio playback of audio data;

displays an edit cursor positioned next to the text words; and during audio playback, immediately amends the text words, on the display screen and in the transcript data file, in response to inputs from the user device using standard edit and text keys.

2. The system of claim 1 wherein the processing system is configured to amend the timing data paired with the text words based on amendments made to the text words to preserve time alignment between the text words and the audio data.

3. The system of claim 1 wherein the media file includes video data that is in time alignment with the audio data, wherein the processing system is configured to:

receive from the user device a selection of one or more text words; and create an extracted audiovisual media file that selectively includes:

one or more portions of the audio data corresponding to the selected text words and portions the video data that are in time alignment with the one or more portions of the audio data.

4. The system of claim 3 wherein the processing system is configured to embed the selected text words as video information into the video data in time alignment with the corresponding audio data portions.

5. The system of claim 3 wherein the one or more text words include discrete portions of text words that are separated in time and the processing system is configured to, when creating the extracted audiovisual media file, stitch together the portions of audio data and portions of video data that correspond to the discrete portions of text words.

6. The system of claim 3 wherein the processing system is configured to automatically create the extracted audiovisual media file in response to a predetermined user input received at the user device.

7. The system of claim 3 wherein the processing system is configured to provide the audio and video data from the extracted audiovisual media file for review at the user device.

8. The system of claim 3 wherein the processing system is configured to provide the audio and video data from the extracted audiovisual media file to a third party server upon receiving a predetermined instruction from the user device.

9. The system of claim 1 wherein the processing system is configured to determine an audio quality of the received media file and provide an indication to the user device of an audio quality that falls below a threshold.

10. The system of claim 1 wherein the transcript data file includes a plurality of attributes paired with each text word, the editing interface being enabled to update the attributes in dependence on inputs from the user device.

11. The system of claim 10 wherein the attributes include a confidence value indicating a likelihood that a text word has been correctly transcribed from the audio data.

12. The system of claim 11 where the editing interface is enabled to display an indication of the confidence value for a text word on the display screen.

13. The system of claim 11 wherein the editing interface is enabled to update the confidence value for a text word to a maximum value once the text word has been edited.

14. The system of claim 10 wherein the attributes include a speaker attribute that identifies an individual speaker.

15. The system of claim 1 wherein the user interface is enabled to present an audio waveform on the display screen that visually represents volume levels in the audio data over time, and display a marker on the waveform that is time aligned with audio playback of the audio data.

16. The system of claim 1, wherein the amended text words are automatically communicated through the network connection back to a media editing system so that a corresponding word in an edit data file can be automatically updated to a corrected state.

17. The system of claim 1, wherein a navigation tool is configured to allow for automatic selection of the text words for editing.

18. A method for providing transcript data comprising:

creating a transcript data file by:

transcoding a media file to a predetermined audio format optimized for a speech to text service transmitting, over a network connection, the media file through the network connection to the speech to text service;

receiving a raw transcript data file through the network connection from the speech to text service; and reformatting the raw transcript data to a format optimized for the editing interface;

storing the reformatted raw transcript data file as the transcript data file that includes a plurality of text words transcribed from audio words included in the audio data, and timing data paired with the text words indicating locations in the audio data of the corresponding audio words from which the text words are transcribed;

providing the audio data for playback at a user device;

providing the text words for display on a display screen at the user device;

causing a visual marker to be displayed on the display screen to indicate the text words on the display screen in time alignment with the audio playback of the corresponding audio words at the user device;

displaying an edit cursor positioned next the text words; and during audio playback, immediately amending the text words, using standard edit and text keys, on the display screen and in the transcript data file in response to inputs from the user device.

19. The method of claim 18 comprising amending the timing data paired with the text words based on amendments made to the text words to preserve time alignment between the text words and the corresponding audio words.

20. The method of claim 18 wherein the media file includes video data that is in time alignment with the audio data, the method comprising: receiving from the user device a selection of one or more text words; and creating an extracted audiovisual media file that selectively includes:

one or more portions of the audio data that include the audio words corresponding to the selected text words and portions the video data that are in time alignment with the one or more portions of the audio data.

21. The method of claim 20 comprising embedding the selected text words as video information into the video data in time alignment with the corresponding audio data portions.

22. The method of claim 20 comprising automatically creating the extracted audiovisual media file in response to a predetermined user input received at the user device.

23. The method of claim 18, wherein the amended text words are automatically communicated through the network connection back to a media editing system so that a corresponding word in an edit data file can be automatically updated to a corrected state.

24. The method of claim 18, wherein a navigation tool is configured to allow for automatic selection of the text words for editing.

* * * * *